United States Patent
Iyer et al.

(10) Patent No.: US 12,430,157 B2
(45) Date of Patent: Sep. 30, 2025

(54) WORKSPACE ADMINISTRATION SYSTEM AND METHOD FOR A WORKSPACE ORCHESTRATION SYSTEM

(71) Applicant: Dell Products, L.P., Round Rock, TX (US)

(72) Inventors: Vivek Viswanathan Iyer, Austin, TX (US); Gokul Thiruchengode Vajravel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 691 days.

(21) Appl. No.: 17/206,249

(22) Filed: Mar. 19, 2021

(65) Prior Publication Data

US 2022/0300313 A1 Sep. 22, 2022

(51) Int. Cl.
*G06F 9/455* (2018.01)
*G06F 16/11* (2019.01)

(52) U.S. Cl.
CPC .......... *G06F 9/45558* (2013.01); *G06F 16/11* (2019.01); *G06F 2009/4557* (2013.01)

(58) Field of Classification Search
None
See application file for complete search history.

(56) References Cited

U.S. PATENT DOCUMENTS

| | | | |
|---|---|---|---|
| 10,924,590 B1* | 2/2021 | Zhang | G06N 20/00 |
| 2014/0149998 A1* | 5/2014 | Kumar | G06F 9/542 |
| | | | 719/329 |
| 2020/0092382 A1* | 3/2020 | Borkar | H04L 67/142 |
| 2021/0314424 A1* | 10/2021 | Kolhar | H04L 43/0876 |

OTHER PUBLICATIONS

Desai et al., A Scalable Approach to Deploying and Managing Appliances, Jun. 4, 2007, Teragrid 2007 Conference, Madison, WI, pp. 1-6 (Year: 2007).*

* cited by examiner

*Primary Examiner* — Anil Khatri
*Assistant Examiner* — Melissa A Headly
(74) *Attorney, Agent, or Firm* — Fogarty LLP

(57) ABSTRACT

According to one embodiment, an information Handling System (IHS) includes a workspace orchestration service that is executed to manage deployment of workspaces on the IHS having computer-executable instructions to, for each of a plurality of workspaces instantiated on the IHS, communicate with the workspace to receive application parameters associated with an application configured in the workspace, and store the application parameters at a specified location. The instructions further identify at least one of the application parameters that is to be modified using an IHS management process, and communicate with the workspace to send information associated with the at least one application parameter to the workspace, wherein the workspace is executed to modify the application according to the at least one application parameter. The IHS management process accesses the one or more application parameters from the specified location; using an IHS management process.

19 Claims, 9 Drawing Sheets

WORKSPACE ADMINISTRATION SYSTEM AND METHOD FOR A WORKSPACE ORCHESTRATION SYSTEM

FIELD

This disclosure relates generally to Information Handling Systems (IHSs), and, more specifically, to workspace administration system and method for a workspace orchestration system.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment that operates on the IHS, where such isolated software environments may be referred to by various names, such as virtual machines, containers, dockers, etc. Various types of such segregated environments are isolated by providing varying degrees of abstraction from the underlying hardware and from the operating system of the IHS. These virtualized environments typically allow a user to access only data and applications that have been approved for use within that particular isolated environment. In enforcing the isolation of a virtualized environment, applications that operate within such isolated environments may have limited access to capabilities that are supported by the hardware and operating system of the IHS.

SUMMARY

According to one embodiment, an information Handling System (IHS) includes a workspace orchestration service that is executed to manage deployment of workspaces on the IHS having computer-executable instructions to, for each of a plurality of workspaces instantiated on the IHS, communicate with the workspace to receive application parameters associated with an application configured in the workspace, and store the application parameters at a specified location. The instructions further identify at least one of the application parameters that is to be modified using an IHS management process, and communicate with the workspace to send information associated with the at least one application parameter to the workspace, wherein the workspace is executed to modify the application according to the at least one application parameter. The IHS management process accesses the one or more application parameters from the specified location.

According to another embodiment, a method includes the steps of, using an information Handling System (IHS) with a workspace orchestration service that is executed to manage deployment of workspaces on the IHS, communicating with the workspace to receive application parameters associated with an application configured in the workspace, and storing the application parameters at a specified location. The method further includes the steps of identifying at least one of the application parameters that is to be modified using an IHS management process, and communicating with the workspace to send information associated with the at least one application parameter to the workspace, wherein the workspace is executed to modify the application according to the at least one application parameter. The IHS management process accesses the one or more application parameters from the specified location.

According to yet another embodiment, an information Handling System (IHS) includes computer-executable instructions to communicate with the workspace to receive application parameters associated with an application configured in the workspace, and store the application parameters at a specified location. The instructions further identify at least one of the application parameters that is to be modified using an IHS management process, and communicate with the workspace to send information associated with the at least one application parameter to the workspace, wherein the workspace is executed to modify the application according to the at least one application parameter. The IHS management process accesses the one or more application parameters from the specified location.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
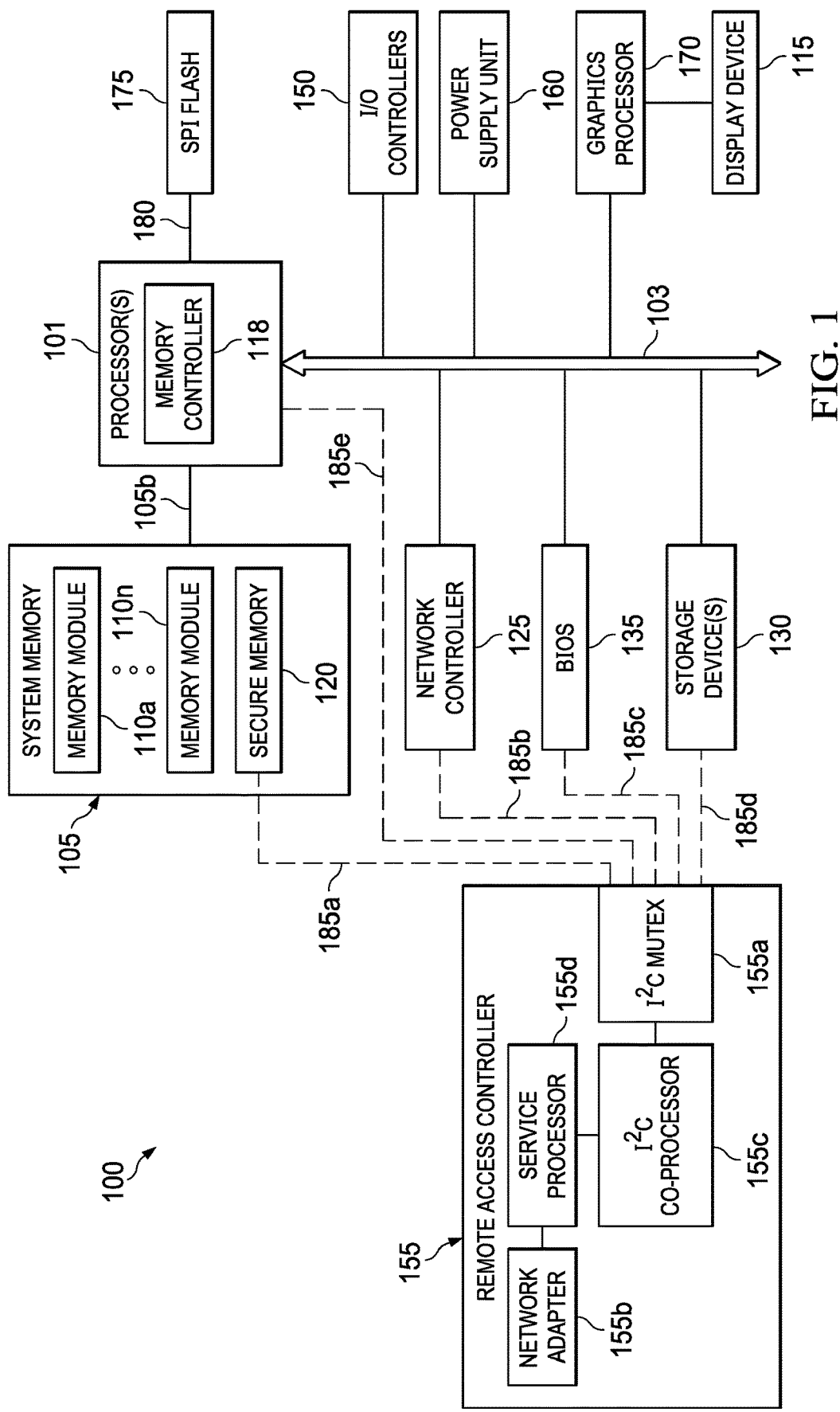
FIG. 1 is a diagram illustrating certain components of an IHS operable, according to some embodiments, to support secure use of resources of the IHS by workspaces operating on the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting certain components of an illustrative IHS 100 that is operable according to various embodiments for secure use of resources of the IHS 100 by workspaces operating on the IHS 100. In some embodiments, IHS 100 may be employed to instantiate, manage, and/or terminate a secure workspace that may provide the user of IHS 100 with access to protected data in an isolated software environment in which the protected data is segregated from: the operating system (OS) of the IHS 100, other applications executed by IHS 100, other workspaces operating on IHS 100 and, to a certain extent, the hardware of the IHS. In some embodiments, the construction of a workspace for a particular purpose and for use in a particular context may be orchestrated remotely from the IHS 100 by a workspace orchestration service, such as described with regard to FIG. 2. In some embodiments, portions of the workspace orchestration may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

As shown in FIG. 1, IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or that may be configured to support specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 105b.

System memory 105 that is coupled to processor(s) 101 via memory bus 105b provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a set of busses that couple processor 101 to various hardware components installed in the same motherboard. In some embodiments, all or portions of chipset 103 may be implemented directly within the integrated circuitry of processor(s) 101. Chipset 103 thus provides processor(s) 101 with access to a variety of hardware resources. In IHS 100, chipset 103 is illustrated as a single coupling with processor 101. However, other implementations may utilize any number of connections to provide the illustrated communication pathways supported by chipset 103. In some instances, capabilities supported by processor 101 are not directly available to workspaces operating on IHS 100 due to the isolation of these workspaces from certain hardware and software of the IHS.

In certain embodiments, IHS 100 may include a SPI (Serial Peripheral Interface) flash device 175 that stores certain data and instructions utilized by processor 101. The SPI flash 175 may be a non-volatile memory device capable of being electrically erased and reprogrammed. SPI flash 175 may be coupled to processor 101 over an SPI bus 180 that supports transfers of blocks of data to and from SPI flash 175. In some embodiments, SPI flash 175 may be divided into various regions, with each region storing different types of instructions and/or data. In certain embodiments, some of the regions of SPI flash 175 may be provisioned during trusted manufacture of IHS 100, such as with boot code, cryptographic keys, firmware reference signatures, and tokens that are used to implement security protocols utilized by IHS 100.

As illustrated, processor(s) 101 may also be coupled to a network controller 125, such as provided by a Network Interface Controller (NIC) that is coupled to the IHS 100 and allows the IHS 100 to communicate with other systems, such as other IHSs similarly configured to IHS 100, via an external network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In some embodiments, network controller 125 may be instrumented with a controller or other logic unit that supports a sideband management connection 185b with remote access controller 155. In some instances, capabilities supported by network controller 125 are not directly available to workspaces operating on IHS 100 due to the isolation of these workspaces from certain hardware and software of the IHS.

Chipset 103 may also support communications with one or more display device(s) 115 via graphics processor 170. In certain embodiments, graphics processor 170 may be comprised within one or more video or graphics cards or an embedded controller installed as components of the IHS 100. Graphics processor 170 may generate display information and provide the generated information to one or more display device(s) 115 coupled to IHS 100, where display device(s) 115 may include integrated display devices and/or external display devices coupled to IHS. In certain embodiments, some or all of the functions supported by graphics processor 170 may be integrated within processor 101. The one or more display devices 115 coupled to IHS 100 may utilize LCD, LED, OLED, or other thin film display technologies. Each display device 115 may be capable of touch input such as via a touch controller that may be a component of display device 115, graphics processor 170, or a separate component of IHS 100 accessed via bus 103. In some instances, capabilities supported by graphics processor 170 are not directly available to workspaces operating on IHS 100 due to the isolation of these workspaces from certain hardware and software of the IHS.

In certain embodiments, chipset 103 may utilize one or more I/O controllers 150 to access various I/O hardware components such as user input devices and sensors. For instance, I/O controllers 150 may provide access to user-input devices such as a keyboard, mouse, touchpad, touchscreen and/or other peripheral input devices. User input devices may interface with a 1/O controller 150 through wired or wireless connections. Sensors accessed via 1/O controllers 150 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). In some instances, sensor capabilities supported are not directly available to workspaces operating on IHS 100 due to the isolation of these workspaces from certain hardware and software of the IHS.

In some embodiments, the data inputs collected by such sensors may be received by sensor hub capable of utilizing this information in determining various physical characteristics of the location and manner in which IHS 100 is being utilized. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or by a network interface. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing the integrated display 115.

Chipset 103 also provides processor(s) 101 with access to one or more storage devices 130. In various embodiments, a storage device 130 may be integral to the IHS 100, or may be external to the IHS 100. In certain embodiments, storage device 130 may be accessed via a storage controller that may be an integrated component of the storage device. Storage device 130 may be implemented using any memory technology allowing IHS 100 to store and retrieve data. For instance, storage device 130 may be a magnetic hard disk storage drive or a solid-state storage drive. In some embodiments, storage device 130 may be a system of storage devices, such as a cloud drive accessible via network controller 125. In some embodiments, storage device 130 may be instrumented with a controller or other logic unit that supports a sideband management connection 185d with remote access controller 155. In some instances, data storage capabilities supported by storage devices 130 are not directly available to workspaces operating on IHS 100 due to the isolation of these workspaces from certain hardware and software of the IHS.

IHS 100 may also include a BIOS (Basic Input/Output System) 135 component that may include instructions stored in a non-volatile memory that may be accessible by processor 101. The BIOS 135 provides an abstraction layer that allows an operating system of the IHS 100 to interface with the hardware components of the IHS 100. Accordingly, BIOS 135 provides an abstraction layer to the firmware utilized by various hardware components of IHS 100. In some embodiments, BIOS 135 may be implemented using a dedicated microcontroller coupled to the motherboard of IHS 100. In some embodiments, some or all of BIOS 135 may be implemented as operations of an embedded controller, such remote access controller 155. Upon powering or restarting IHS 100, processor(s) 101 may utilize BIOS 135 to initialize and test various hardware components of the IHS 100. Upon successful validation of these hardware components, in some embodiments, BIOS 135 may also initiate loading of an operating system for use by the IHS 100. As illustrated, BIOS 135 may be instrumented with a controller or other logic unit that supports a sideband management connection 185c with remote access controller 155. In certain embodiments, this sideband management connection 185c may be utilized by remote access controller 155 to identify communication capabilities that are supported by IHS 100 and that may be used in support of secure communications by workspaces operating on IHS 100.

As illustrated, IHS 100 may also include a power supply unit 160 that provides the hardware components of IHS 100 with appropriate levels of DC power. Power inputs received via a power port or via USB ports may be routed to the power supply unit 160 of IHS 100. The power inputs received by power supply unit 160 may be used in powering the operations of IHS 100 and in recharging internal batteries of IHS 100. In some embodiments, power supply unit 160 may support power outputs drawn from the internal batteries of IHS 100 and provided to external devices coupled to IHS 100, such as USB devices coupled to USB ports of IHS 100. In some embodiments, power supply unit 160 may provide power to components of IHS 100 using multiple independent power planes. For instance, as described below, remote access controller 155 may be powered from a separate power plane from processor 101.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 155 may operate from a different power plane from processors 101, storage devices 130, network controller 125 and various other components of IHS 100, thus allowing the remote access controller 155 to operate, and management tasks to proceed, while the processing cores of IHS 100 are powered off. In some embodiments, various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may support monitoring and administration of various managed devices 101, 120, 125, 130, 135 of an IHS via a sideband bus interface. For instance, messages utilized in device management may be transmitted using I2C sideband bus connections 185a-e that may be individually established with each of the respective managed devices 101, 120, 125, 130, 135 through the operation of an I2C multiplexer 155a of the remote access controller. As illustrated, managed devices 125, 130, 135 of IHS 100 are coupled to the IHS processor(s) 101 via one or more in-band buses supported by chipset 103, where these in-band busses are separate from the I2C sideband bus connections 185b-d used for device management. Accordingly, managed devices 125, 130 and 135 communicate with the operating system of IHS 100 via in-band buses supported by chipset 103, while the sideband buses 185b-d are used by managed devices exclusively for communications with remote access controller 155.

In certain embodiments, a service processor 155d of remote access controller 155 may rely on an I2C co-processor 155c to implement sideband I2C communications between the remote access controller 155 and managed components 101, 120, 125, 130, 135 of the IHS. The I2C co-processor 155c may be a specialized co-processor or micro-controller that is configured to interface via a sideband I2C bus interface with the managed hardware components 101, 120, 125, 130, 135 of IHS. In some embodiments, the I2C co-processor 155c may be an integrated component of the service processor 155d, such as a peripheral system-on-chip feature that may be provided by the service processor 155d. Each I2C bus 185a-e is illustrated as single line in FIG. 1. However, each I2C bus 185a-e may be comprised of a clock line and data line that couple the remote access controller 155 to I2C endpoints 101, 120, 125, 130, 135 on each of the managed components.

As illustrated, the I2C co-processor 155c may interface with the individual managed devices 101, 120, 125, 130, 135 via individual sideband I2C buses 185a-e selected through the operation of an I2C multiplexer 155a. Via switching operations by the I2C multiplexer 155a, a sideband bus connection 185a-e may be established through a direct coupling between the I2C co-processor 155c and each of the individual managed devices 101, 120, 125, 130, 135. In providing sideband management capabilities, the I2C co-processor 155c may interoperate with corresponding endpoint I2C controllers that implement the I2C communications of the respective managed devices 101, 120, 125, 130, 135. The endpoint I2C controllers may be implemented as dedicated microcontrollers for communicating sideband I2C messages with the remote access controller 155, or endpoint I2C controllers may be integrated SoC functions of a processor of the respective managed device endpoints 101, 120, 125, 130, 135.

In some embodiments, remote access controller 155 may perform various operations in support of the delivery and deployment of workspaces to IHS 100. In certain embodiments, remote access controller 155 may interoperate with a remote orchestration service via the described out-of-band communications pathways that are isolated from the operating system that runs on IHS 100. In some embodiments, a network adapter 155b that is distinct from network controller 125 utilized by the operating system of IHS 100 may support such out-of-band communications between remote access controller 155 and a remote orchestration service. Via this out-of-band signaling pathway, remote access controller 155 may receive authorization information that may be used for secure delivery and deployment of a workspace to IHS 100 and to support secure communication channels between deployed workspaces and various capabilities supported by IHS 100, while still maintaining isolation of the workspaces from the hardware and operating system of IHs 100.

In some embodiments, authorization and cryptographic information received by remote access controller 155 from a remote orchestration service may be stored to secured memory 120. As illustrated in FIG. 1, in some embodiments, remote access controller 155 may access secured memory 120 may via an I2C sideband signaling pathway 185a between I2C multiplexer 155a and an I2C communication capability supported by secure memory 120. Remote access controller 155 may support execution of a trusted operating environment that supports secure operations that are used to deploy a workspace on IHS 100. In certain embodiments, remote access controller 155 may calculate signatures that uniquely identify various hardware and software components of IHS 100. For instance, remote access controller 155 may calculate hash values based on instructions and other information used to configure and operate hardware and/or software components of IHS 100. For instance, remote access controller 155 may calculate a hash value based on firmware and on other instructions or settings of a component of a hardware component. In some embodiments, hash values may be calculated in this manner as part of a trusted manufacturing process of IHS 100 and may be stored in the secure storage 120 as reference signatures used to validate the integrity of these components at a later time. In certain embodiments, a remote orchestration service supporting the deployment of workspaces to IHS 100 may verify the integrity of the remote access controller 155 in a similar manner, by calculating a signature of remote access controller 155 and comparing it to a reference signature calculated during a trusted process for manufacture of IHS 100.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
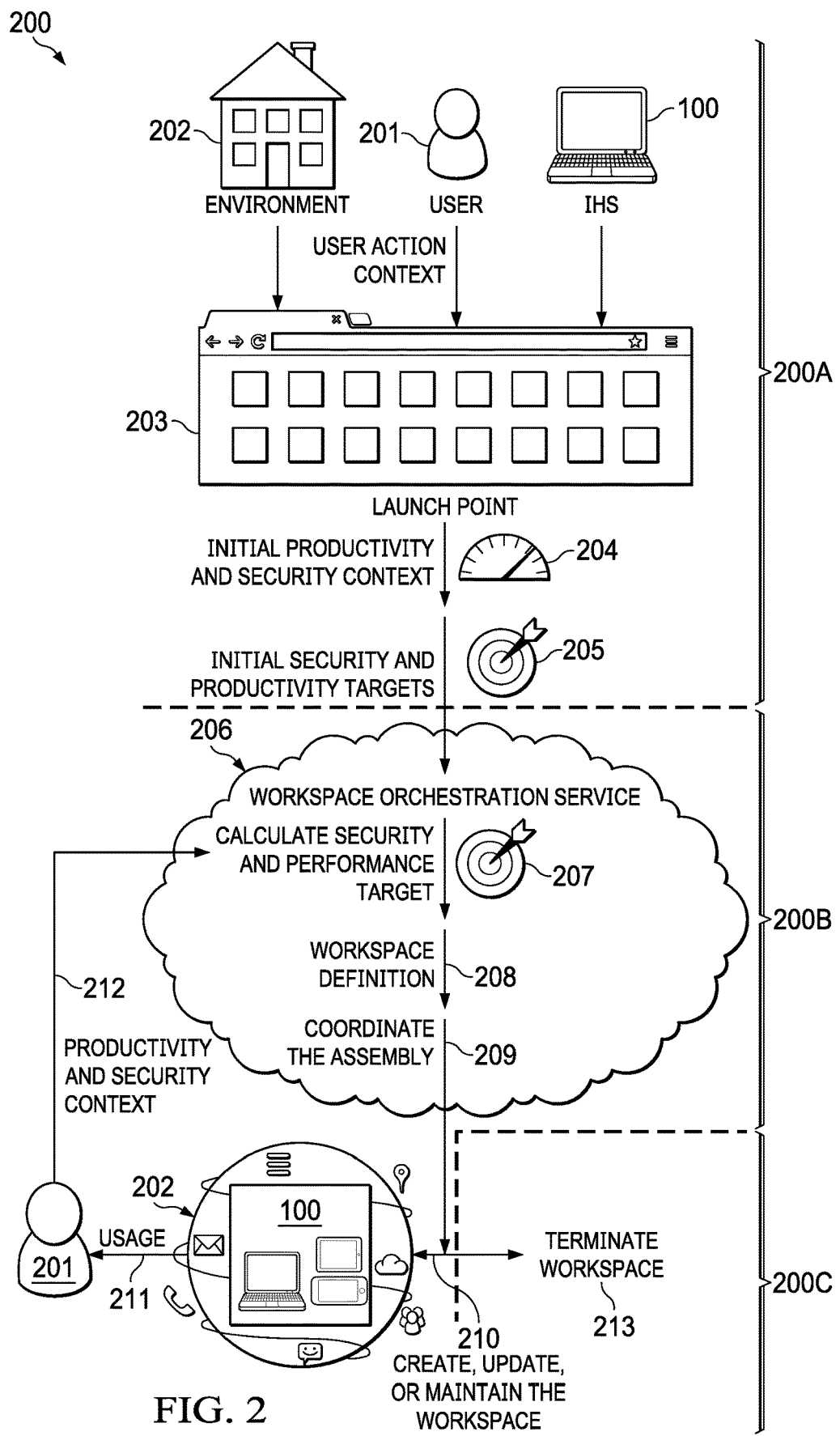
FIG. 2 is a diagram depicting illustrative embodiments of methods and system for deployment and management of workspaces on an IHS in a manner that supports secure use of resources of an IHS by workspaces operating on the IHS.

FIG. 2 is a diagram depicting illustrative embodiments of methods and system for deployment and management of workspaces on an IHS in a manner that supports secure use of resources of an IHS by workspaces operating on the IHS. Forsake of explanation, the workspace lifecycle supported by embodiments has been split into three phases: workspace initialization phase 200A, workspace orchestration phase 200B, and workspace termination phase 200O. During initialization 200A, user 201 operates an IHS 100, such as described with regard to FIG. 1, within a physical environment 202 (e.g., any type of environment and its associated context, including physical location, geographic location, location within a particular facility or building, detected networks, time of day, proximity of the user, individuals in the vicinity of IHS 100, etc.).

The illustrated method for the workspace lifecycle according to embodiments may be initiated with an action by user 201 at a user interface that serves as a launch point 203 for initiating a workspace. In various instances, launch point 203 may be a corporate launch point provided by an employer of user 201, a manufacturer launch point provided by the manufacturer of IHS 100, or a third-party launch point provided as a service to user 201 by a third-party. In various instances, user 201 may operate IHS 100 to access a launch point 203 that is provided in the form of a web portal, a portal application running in the operating system of IHS 100, or a special-purpose portal workspace operating on IHS 100. In various embodiments, launch point 203 may be implemented using graphical, textual and/or audio interfaces by which data or other resource may be requested by a user 201. In various implementations, launch point 203 may include Graphical User Interface (GUI) elements, such as icons, that represent different software applications, data sources and/or other resources that the user may select for use via a workspace. As such, launch point 203 may provide a user with an ability to request initiation of a workspace that process access to software applications and data sources that are available to the user 201.

As described in additional detail below, workspaces for providing user 201 with access to protected data or other resources may operate using a local management agent 332 that operates on IHS 100 and is configured to interoperate with workspace orchestration service 206. As described, launch point 203 may be provided in the form of a portal (e.g., a webpage, OS application or special purpose workspace) that includes a user interface that allows user 201 to request access to managed resources. In some embodiments, launch point 203 may be hosted by the local management agent 332 that runs on IHS 100 and interoperates with remote workspace orchestration service 206. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source that is managed by the workspace orchestration service 206. In response to an access request issued by user 201 (e.g., the user "clicks" on an icon presented by launch point 203), at 204, local management agent 332 of IHS 100 collects initial security context information and productivity context information. In various embodiments, the security context information of a workspace may include attributes indicating a security risk associated with: the data and/or application being requested, a level of risk presented by the user 201, the hardware of the IHS 100, the logical software environment of IHS 100 in which a workspace will be deployed, and the physical environment 202 in which IHS 100 is currently located. Accordingly, in this disclosure, a "security context" generally refers to data or other information related to a security posture in which a workspace will be deployed and utilized, where the security posture may be based on characteristics of user 201, IHS 100, the data and/or application to be accessed via the workspace, and/or environment 202. In some embodiments, a security context may be quantified as a security risk score in support of evaluations of the level or risk associated with providing user 201 access to requested data and/or application while using IHS 100 in the particular context.

In various embodiments, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the operating system and other applications in use on IHS 100, availability of encryption, type of available encryption, access to secured storage, use of attestable hardware by IHS 100, and supported degree of workspace isolation by IHS 100.

In this disclosure, "productivity context" generally refers to user 201 productivity associated with a workspace, user 201, IHS 100, and/or environment 202. A "productivity score" generally refers to an index usable to score, quantify, or measure various productivity characteristics of a productivity context. Examples of productivity context information may include, but are not limited to: the hardware of the IHS 100 that is available for use in support of a workspace, the software of the IHS 100 that is available for use in support of the workspace, power states of IHS 100 and/or hardware components of IHS 100, maximum clock frequencies of hardware components of IHS 100 that can currently be supported, maximum operating speeds of software components of IHS 100, peripheral devices coupled to IHS 100 and networks available for use by IHS 100 in supporting the workspace.

Initial productivity and security targets for a workspace may be calculated, at 205, based on the context of user's 201 actions combined with the productivity and security context in which the workspace will operate. In some cases, at 205, a local management agent 332 operating on IHS 100 may calculate initial security and productivity targets based upon the collected security and productivity context. In other cases, remote workspace orchestration service 206 may calculate security and productivity targets for a workspace. In this disclosure, "security target" generally refers to the attack surface presented by a workspace that is created and operated based on a specific workspace definition, while "productivity target" generally refers to the productivity characteristics of a specific workspace definition. Examples of productivity target characteristics include, but are not limited to: types of data or data sources available to user 201 within a workspace, latency of the workspace, software applications available within the workspace, responsiveness of the workspace and remaining computational overhead available to the workspace. Attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces and the ability to extend a workspace. In some instances, productivity and security targets may also be based on user's 201 behavioral analytics, IHS 100 telemetry and/or environmental information that is collected via sensors of IHS 100.

In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of the security context (e.g., location, patch level, threat information, network connectivity, etc.) and the productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 that is configured for operation with the workspace orchestration service 206.

In specifying capabilities and constraints of a workspace, a workspace definition 208 may prescribe one or more of: authentication requirements for user 201, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), and workspace capabilities available to independently attach other resources.

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during an orchestration phase 200B of workspace deployment, at 208, the initial security and productivity targets are processed and/or reconciled against resources, IHS capabilities, and cloud services capabilities in order to produce a workspace definition. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace, applications to be provided for operation within the workspace, aggregation of resources available via the workspace, configurations for accessing data or resources (e.g., required use of a virtual private network (VPN)).

As described in additional detail with regard to FIG. 3, the initial workspace definition may then be utilized by an automation engine 302 of workspace orchestration service 206 to coordinate the assembly 209 and instantiation 210 of a workspace on an appropriate platform (e.g., on the cloud, on IHS 201, or some combination of the two) based on the security and productivity contexts in which the workspace will operate. In some embodiments, automation engine 302 may resolve configuration conflicts between a workspace definition and the user's inputs in the operation of a workspace. In cases where a workspace is cloud-hosted, the automation engine 302 may assemble and instantiate a remote workspace that may be accessed via a secure connection established via a web browser or other web-based component operating on the IHS 100.

At 211 of FIG. 2, the instantiated workspace is operated by user 201 and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation, at 207, of the security and performance targets by automation engine 302. Additionally or alternatively, a new workspace context, security target, and/or productivity target may be now measured against the initial targets, and the result may cause automation engine 302 to produce a new workspace definition at 208.

Particularly, if the instantiated workspace(s) have security or productivity parameters that fall outside of a range of the target scores for these parameters such that a difference between an updated context information and the previous context information is scored below a threshold value, automation engine 302 may generate modifications to an existing workspace and, at 210, may deploy an updated workspace according to the modified definition. Conversely, if the difference between an updated context information and the previous context information is scored above a threshold value, automation engine 302 may generate a new workspace at 210. Session data metadata and context may be preserved by data aggregation engine 336, and session data may be restored in the new workspace as applicable.

Various conditions may trigger termination of a workspace at 213, as part of termination phase 2000. In some cases, user action may initiate the termination of a workspace (e.g., user 201 closes application or browser accessing data). In other cases, termination of a workspace may take place automatically as part of an adjustment in workspace definition (e.g., the workspace is terminated by automation engine 302 in order to support a new or updated workspace). As part of a termination phase 2000 of a workspace, various workspace resources of IHS 100 and/or at workspace orchestration service 206 may be released.

Figure 3A:
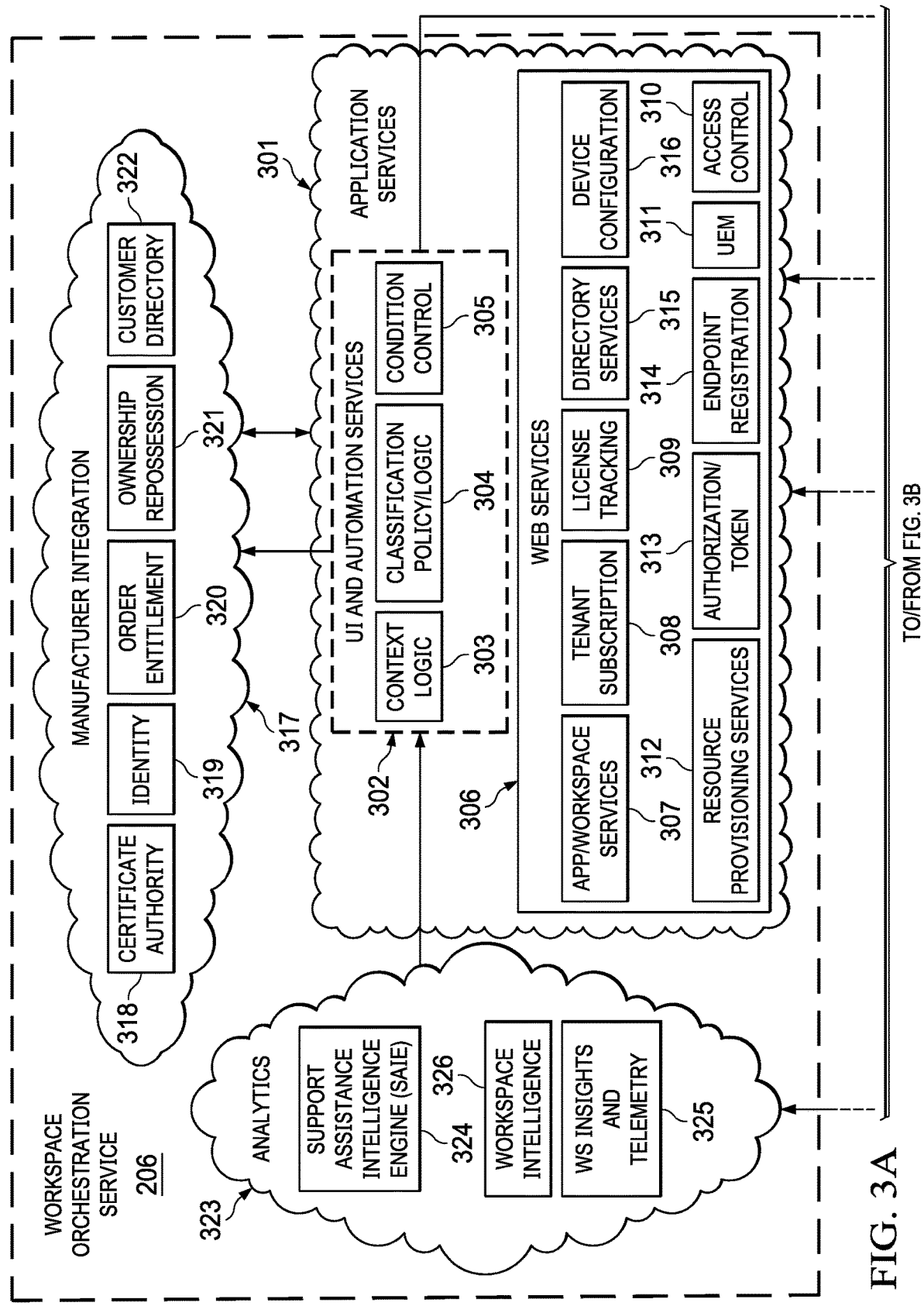
FIGS. 3A and 3B are a diagram depicting an illustrative system configured according to embodiments for deployment and management of workspaces on an IHS in a manner that supports secure use of resources of the IHS by workspaces operating on the IHS.
Figure 3B:
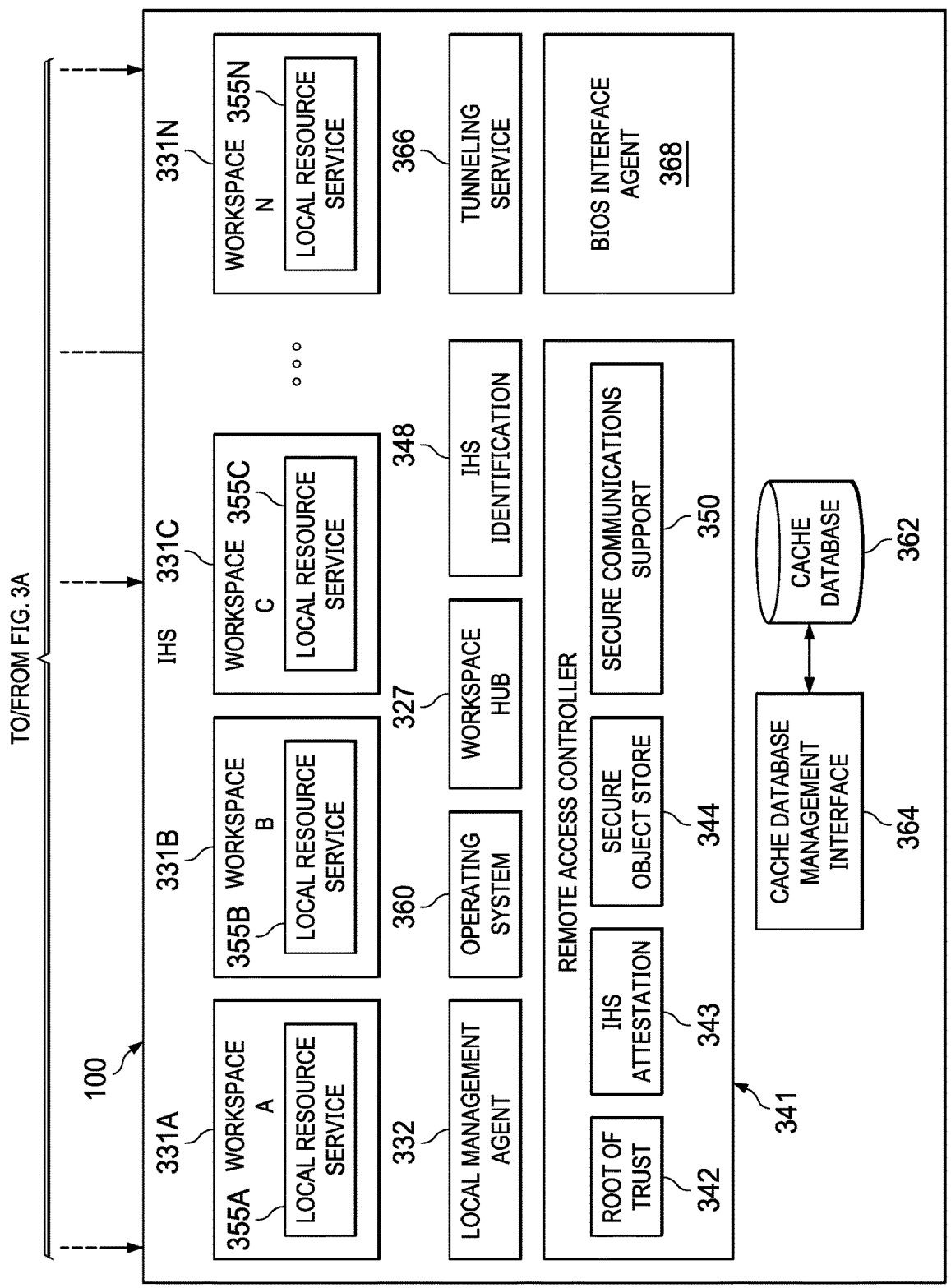

FIGS. 3A and 3B are diagrams depicting illustrative embodiments of a system for deployment and management of workspaces on an IHS 300B in a manner that supports secure use of resources of the IHS by workspaces operating on the IHS. The illustrated system includes a workspace orchestration service 206 that performs various workspace orchestration operations described above, such as: the evaluation of security and productivity targets based upon context information, the calculation of risk scores and other productivity and security metrics based on ongoing collection of context information, the generation of workspace definitions, and the assembly and instantiation of workspaces in accordance with a workspace definition, where the workspaces may be instantiated via a cloud service or an IHS 100, such as described with regard to FIG. 1 and further described with regard to FIG. 3B. As described, IHS 100 may supported deployment and operation of workspaces through the collection of productivity and security context information, the calculation of productivity scores and/or risk scores, the instantiation, execution, and modification of a workspace based upon workspace definitions that are received from workspace orchestration service 206.

Workspace orchestration service 206 and IHS 100 may be coupled to each other via any suitable network technology and/or protocol which allows workspace orchestration service 206 to interoperate with IHS 100. As described with regard to FIG. 1, an IHS 100 according to embodiments may include a component such as a remote access controller 155 that may support secure out-of-band communications that are independent from the operating system of IHS 100. In some embodiments, such a remote access controller may be configured to utilize such out-of-band communication capabilities to support deployment and operation of workspaces on IHS 100 and to report changes in context information to the workspace orchestration service 206.

As illustrated in FIG. 3A, workspace orchestration service 206 may include a number of sub-components that support deployment and ongoing evaluation and adaptation of workspaces on an IHS 100. Embodiments of the workspace orchestration service 206 may include systems that may support web services 306, manufacturer integration 317, and analytics 323. As illustrated, web services 306 may, in turn, comprise application services 301 and user interface (UI) and automation services 302. In some embodiments, analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, performance measurements, use of features, settings, etc.) resulting from the operation of workspaces. Workspace intelligence 326 may include an intelligence engine for processing and evaluating context data in order to identify patterns and tendencies in the operation of workspaces and in the adaptation of workspaces based on context changes.

As illustrated, an application services 306 system of the workspace orchestration service 206 may include a UI and automation services 302 system that may include context logic engine 303, classification policy logic 304, and condition control engine 305. Context logic engine 303 may support processing of context information in making risk assessments (e.g., evaluating the risk associated with requests by the user against the context of the user's behavior, history of the use of IHS 100, capabilities of IHS 100, and environmental conditions). For instance, security context information collected by IHS 100 may be provided to workspace orchestration service 206 where it may be used by context logic 303 to calculate a risk score associated with a request for use of a managed data source and/or application. Classification policy 304 may include administrator and machine-learning defined policies describing risk classifications associated with different security contexts, such as risk classifications associated with specific data, locations, physical environments, IHSs, logical environments, and user actions (e.g., use of high-risk data requires use of a workspace definition suitable for use with a risk score above a specific value). Condition control engine 305 may include intelligence providing automated decision making for alignment of risk and context. In some cases, condition control engine 305 may dynamically deploy a solution to address any detected misalignment of risk and context. For instance, upon requesting access to a highly classified data source that results in a significant increase in risk score, the condition control engine may select workspace definition modifications that implement security procedures that are suitable for the higher risk score.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container). In some embodiments, a workspace definition may be used to specify various such types of workspace deployments that will be used to provide a user with access to an application. Web services 306 may also include a tenant subscription module 308, that performs dynamic configuration of an IHS 100 for use with the described workspace orchestration services 206 at the point-of-sale (POS) of the IHS. A license tracking module 309 may be used to maintain and track license information for software, services, and IHSs. An access control module 310 may provide top level access controls used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces deployed on IHS 100 may further include resource provisioning services 312 for configuring IHS 100 or a workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned to IHS 100, such as to secure memory 120, as part of a trusted assembly process of IHS 100 and, in some instances, associated with a unique identifier 348 of the IHS 100. Web services 306 may also include an authorization/token module 313 that provides identity functions and may connect to various authentication sources, such as Active Directory. Endpoint registration module 314 may be configured to register IHSs and/or workspaces in order to track the use of the described workspace orchestration. In some scenarios, a directory services 315 module may be configured to provide active directory services (e.g., AZURE ACTIVE DIRECTORY from MICROSOFT CORPORATION). Device configuration services 316 may enable central configuration, monitoring, managing, and optimization of workspaces that in certain contexts may operate remotely from an IHS and may only present the user of the IHS with a user interface that presents an image of the workspace output. In cooperation with resource provisioning services 312, device configuration services 316 may also handle creation of secrets and IHS configuration.

Still referring to FIG. 3A, manufacturer integration components 317 communicate with application services 301 and client IHS 100 to provide features that are usable during workspace evaluation and instantiation, where these features may be based upon information available to the manufacturer of IHS 100. For instance, certificate authority 318 may include an entity that issues digital certificates that may be used in validating the authenticity and integrity of the hardware of IHS 100. Identity service module or engine 319 may be configured to manage the user identities, as well as brokering user identification for use of customer directory 322. Order entitlement engine 320 may be used to manage purchased entitlements as well as the associated issued certificates signed by 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to IHS 100 of FIG. 3B, in some embodiments, IHS 100 may be configured to operate a local management agent 332 that may operate as a trusted and attestable process of IHS 100 and that may operate independent from the operating system 360 of IHS 100. In some embodiments, local management agent 332 may include a workspace engine that instantiates and manages the operation of one or more workspaces 331A-N on IHS 100. As described, the capabilities of a workspace 331A-N may be modified based on detected changes in the productivity and security contexts in which the workspace is operating. Accordingly, the workload(s) in each of the workspaces 331A-N may be hosted in full or in part by a cloud resource, a specific server, or locally hosted on IHS 100, depending on the context in which the workspace is operating. These allocations of workspace computing for each particular workspace 331A-N may be prescribed by the workspace definition that is used to build and operate each workspace. As described, the workspace definition may be created by workspace orchestration service 206 based upon: context information provided by IHS 100, security targets for each workspace 331A-N, and/or productivity targets for each workspace 331A-N. As described in additional detail below, an individual workspace 331A-N may be provided with use of local resources of IHS 100 via a secure communication mechanism supported by workspace orchestration service 206 and remote access controller 341 of IHS 100. Utilizing the provided embodiments, such use of local resources by workspaces 331A-N may be adapted in response to detected changes in the security context of IHS 100.

In some embodiments, local management agent 332 may be configured to host, launch, and/or execute a workspace hub 327 that provides a launch point 203 by which users may initiate workspaces 331A-N through the selection of managed data and/or resources. As described, launch point 203 may be an agent, application, special-purpose workspace or web portal the provides a user interface by which a user may select from a collection of data sources, applications or other managed information or resources that are available to the user of IHS 100 via the operation of a workspace as described herein. In various embodiments, launch point 203 may be provided in the form for textual, graphical and/or audio user interfaces that allow a user of IHS 100 to select available data and/or resources. Workspace hub 327 may utilize a local environment management module in providing the workspace interface that is presented to the user on IHS 100 in a consistent manner across workspaces 331A-N.

In some embodiments, each instantiated workspace 331A-N may be a logical software environment that provides a user with access to requested data or applications, where the environment may be isolated in varying degrees from the hardware and software of IHS 100 based on the security context and productivity context in which each workspace 331A-N is operating. In some instances, the selection of a data source or resource that is available to user via launch point 203 may result in launching a new workspace 331A-N. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user selects a confidential presentation file available from a data source that is provided by launch point 203, an additional workspace 331A-N may be instantiated with use of a presentation application and with access to the requested presentation file, where this new workspace is created based on a workspace definition that provides appropriate security for access to the confidential presentation. In other instances, a selection of the presentation file by a user may result in the presentation being made available through the existing workspace, in some cases using the existing workspace definition and, in other cases, using a workspace definition that has been modified to support the requested access to the confidential presentation file.

In various embodiments, in order to execute the various operations described herein, local management agent 332 may include a command monitor that provides instrumentation to receive commands from workspace orchestration service 206 in support of adaptation of workspaces 331A-N based on detected changes in context. Local management agent 332 may include a telemetry module that may collect and communicate information to the workspace orchestration service 206, including reporting changes in context that may warrant adjustments to workspaces 331A-N. Local management agent 332 may also utilize a resource manager module that is configured to manage access to data, network configuration, such as for VPNs and network access, identity information, access control, and resource provisioning services. A security module of local management agent 332 may be configured to provide various security services. IHS 100 may include an IHS identification module 348 that provides a unique, unspoofable identifier that is cryptographically bound to IHS 100.

As illustrated in FIG. 3B, IHS 100 includes a remote access controller 341 that provides capabilities for remote management of IHS 100 and that provides out-of-band management of various hardware components of IHS 100. As indicated in FIG. 3B, the remote access controller 341 operates independently from the operating system 360 in providing remote management of IHS 100. A selected portion of the capabilities of a remote access controller 341 are illustrated in FIG. 3B. As described with regard to FIG. 1, a remote access controller 341 may include a root of trust 342 capability that is used to evaluate firmware instructions to be used by various hardware components of IHS 100 against reference signatures for these components, thus validating the firmware in use by these components. In some embodiments, workspace operations supported by workspace orchestration service 206 may require such root of trust validations by remote access controller 341 prior to initiating deployment of workspaces to IHS 100. In some embodiments, remote access controller 341 may include a secure object store 344 for use in storing reference signatures used by root of trust 342 module. As described with regard to FIG. 1, reference signatures utilized by root of trust 342 module may alternatively or additionally be stored in a secure memory of IHS 100. In some embodiments, an IHS attestation 343 module of remote access controller 341 may interface with workspace orchestration service 205 in providing confirmations of root of trust validations of the hardware components of IHS 100.

In some embodiments, remote access controller 341 may also include a secure communications support module 350 that may be used to facilitate secure communications with workspaces 331A-N in providing these workspaces with access to local resources of IHS 100 that have been registered for use in this manner with workspace orchestration service 206. As described in additional detail below, configuration of a local resource for use by a workspace 331A-N may include workspace orchestration service 206 providing remote access controller 341 with a handle for use in interfacing with an individual workspace 331A-N in providing the workspace with a selected local resource of IHS 100. As described, an IHS may concurrently support multiple different workspaces 331A-N, each operating according to a separate workspace definition. Each workspace 331A-N may utilize multiple local resources of IHS 100. Each instance of a workspace utilizing a local resource of IHS 100 may be supported by a separate handle that supports secure communications between a workspace and the remote access controller 341. In turn, each handle may include a token and may specify various conditions for the validity of the token, such as a time limit on the validity of a token. The secure communications support module 350 of the remote access controller 341 may manage the various handles in use at any one time in providing workspaces 331A-N with access to local resources of the IHS. In some embodiments, secure communications support module 350 may be configured to evaluate the conditions provided in each handle for the validity of the handle's token in order to determine whether to continue providing a workspace with access to the local resource specified by the handle.

As illustrated, each workspace 331A-N may include a local resource service 335A-N that configures use of available resources of the IHS by a respective workspace. As described in additional detail below, a local resource service 355A-N may interoperate with workspace orchestration service 206 in order to configure a respective workspace 331A-N for use of resources of the IHS 100 that have been registered with the workspace orchestration service 206 as being available for use by workspaces 331A-N. In some instances, such resource of IHS 100 that are available for use by workspaces 331A-N may be identified for workspace orchestration service 206 by remote access controller 341 via out-of-band signaling pathways that are independent from operating system 360 of IHS 100, such as described with regard to FIG. 1. Once a local resource service 355A-N has negotiated use of available IHS resources, workspace orchestration service 206 may provide a respective local resource service 355A-N with a handle that supports a secure means for accessing a local resource of IHS 100, as supported by a remote access controller 341 of the IHS 100.

According to embodiments of the present disclosure, a cache database 362 and an associated cache database management interface 364 may be provided for storing information used by the workspaces 331A-N. The cache database 362 may be used to store files or digital content common to some, most, or all of the workspaces 331A-N. For example, the cache database 362 may be used to store executable files, such as dynamic linked library (DLL) files, application files, or other files including executable code that may be shared among certain workspaces 331A-N. As another example, the cache database 362 may be used to store audio and/or video content that is generated by a first workspace and consumed by a second workspace seamlessly.

Cache database management interface 364 provides an interface for secure communication with the workspace orchestration service 206, and may include logic for implementing certain features of the cache database 362. In one embodiment, cache database management interface 364 may implement a cloud caching system where commonly accessed cloud sourced files may be cached to alleviate communication traffic that would otherwise be required each time a workspace 331A-N requires access to content from a cloud-based source. In another embodiment, cache database management interface 364 may implement a user context discovery system for providing contextual continuity for custom workspaces instantiated on different environments based on each user's personal profile. Methods for providing the cloud caching system and user context discovery system will each be described in detail herein below. In one embodiment, cache database 362 and cache database management interface 364 may be configured inside of a workspace 331A-N so that it can be securely managed by workspace orchestration service 206.

According to one embodiment, a network tunneling service 366 may be provided to enable secure communications between the workspaces 331A-N and workspace orchestration service 206. The network tunneling service 366 may configure secure network communication links between certain services of the workspace orchestration service 206 and the workspaces 331A-N. In one embodiment, the network tunneling service 366 may, upon instantiation of a workspace 331A-N, communicate with its associated local resource service 355A to establish a secure communications tunnel, such as an HTTPS connection, a virtual private network (VPN) connection, or one established according to a suitable communications protocol (e.g., a secure shell (SSH) tunneling protocol, a generic routing encapsulation (GRE) tunneling protocol, an IPSec tunneling protocol, etc.).

According to one embodiment, a BIOS interface agent 368 may be provided in BIOS of IHS 100. In general, BIOS interface agent 368 provides a direct interface for communication between the BIOS 135 along with any associated embedded controllers, and the workspace orchestration service 206. In many currently produced IHSs, the BIOS often includes a SMBIOS interface that can be used to read management information produced by the BIOS 135 of an IHS 100. This feature can eliminate the need for the operating system to probe hardware directly to discover what devices are present in the computer. As such, the BIOS interface agent 368 provide a technique to access characteristics of hardware devices configured in the IHS 100 as well as to manipulate or otherwise modify those hardware resources. In one embodiment, a secure network connection may be established between the BIOS interface agent 368 and workspace orchestration service 206 using the network tunneling service 366.

Figure 4:
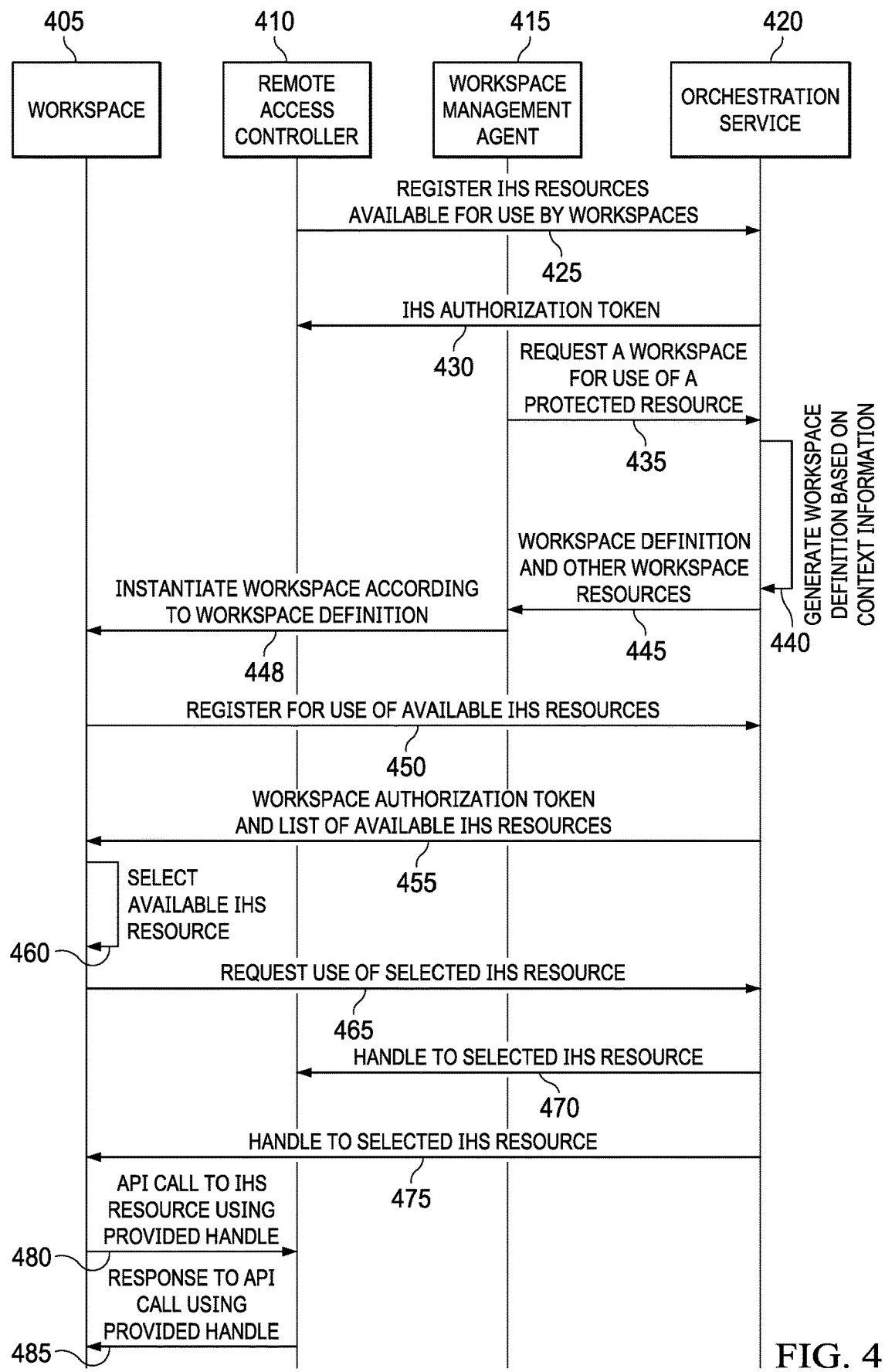
FIG. 4 is a flowchart describing certain steps of a method, according to some embodiments, for secure use of resources of an IHS by workspaces operating on the IHS.
Figure 5:
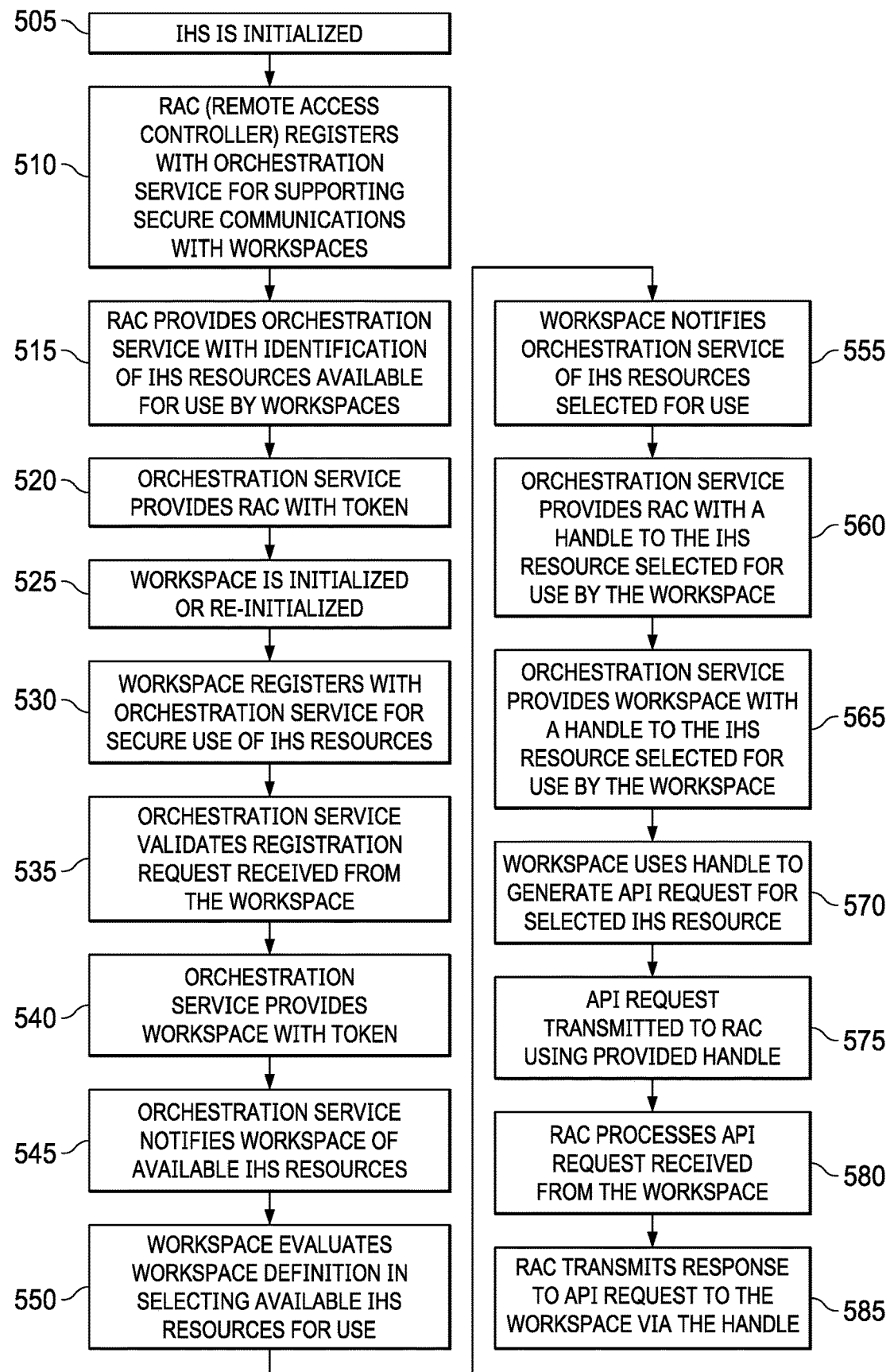
FIG. 5 is a swim lane diagram describing the operation of certain components of a system, according to some embodiments, in configuring secure use of resources of an IHS by workspaces operating on the IHS.

FIG. 4 is a flowchart describing certain steps of a method, according to some embodiments, for secure use of resources of an IHS by workspaces operating on the IHS. FIG. 5 is a swim lane diagram describing the operation of certain components of a system according to some embodiments, in configuring secure use of resources of an IHS by workspaces operating on the IHS. As illustrated in FIG. 5, embodiments may begin with the initialization of an IHS that is configured according to the embodiments described above. As described, in some embodiments, initialization procedures of an IHS may include validation of instructions utilized by various hardware components of the IHS. For instance, firmware instructions to be loaded by a remote access controller 410 of the IHS may be used to generate a hash value that is compared to a digital signature stored in a secure memory of the IHS, where the digital signature corresponds to authentic firmware instructions stored for use by the remote access controller during a trusted manufacturing process of the IHS, or during another trusted administrative process. In this same manner, the firmware instructions utilized by various hardware components of the IHS may be successively validated against stored reference signatures in order to iteratively expand a root of trusted hardware components of the IHS. In some embodiments, the firmware instructions of the remote access controller 410 that are validated in this manner may include instructions used by the remote access controller to determine resources of the IHS that may be utilized by workspaces operating on the IHS and to transmit such local resource information to a remote workspace orchestration service 420.

As indicated at 425 in FIG. 4 and at 510 of FIG. 5, once the instructions utilized by the remote access controller 410 have been validated, the remote access controller may utilize these instructions to communicate with a remote workspace orchestration service 420 in registering for secure use of IHS resources by workspaces operating on the IHS. In some embodiments, the validated firmware instructions utilized by the remote access controller 410 may include instructions for securely determining resources of the IHS that may be used by workspaces operating on the IHS and for transmitting a registration of these available IHS resources to the workspace orchestration service 420. In such instances, the remote access controller 410 thus utilizes validated instructions for configuring operation with workspaces and in communicating with the workspace orchestration service 420, where these instructions are provided during a trusted process for manufacture of an IHS, or during a trusted administrative process.

At 515 of FIG. 5, the remote access controller 410 provides the workspace orchestration service 420 with a listing of IHS resources that are available for use by workspaces 405 operating on the IHS. As described, such list of available resources may include capabilities supported by hardware or software components of the IHS, but are not accessible to workspaces 405 due to their isolation from the underlying hardware and software of the IHS. For instance, available resources may include ACPI (Advanced Configuration and Power Interface) capabilities for querying and configuring power management settings of an IHS. In some instances, available resources may include WMI (Windows Management Instrumentation) capabilities for management of IHSs that operate using a Windows operating system. In some instances, available resources may include use of thread management, memory management or network controller functions that are not accessible by workspaces 405 due to virtualization of the hardware of the IHS. In some embodiments, available resources may support functions that consolidate services in use by different workspaces 405 operating on the IHS, such as consolidation of authentication capabilities in use by the workspaces or consolidation of VPN capabilities. Through the use of such consolidated functions, workspaces 405 may avoid duplicative operations and may also avoid possible inconsistencies that may result from each workspace 405 utilizing a resource of the IHS in isolation from each other.

As indicated at 520 of FIG. 5 and at 430 of FIG. 4, in response to receiving a list of available IHS resources, the workspace orchestration service 420 transmits an authorization token to the remote access controller 410. This authorization token may be used to establish secure communications between a workspace and the remote access controller 410 in providing the workspace with access to the available resources of the IHS. In some embodiments, the authorization token provided to the remote access controller 410 may be calculated based on a unique identifier of the IHS, such as an identifier provided by an IHS identification 348 function of IHS, where this unique identifier may be a service tag or other unique code assigned to IHS upon its manufacture. By generating the authorization token based on a unique identifier of IHS, the token is thus bound to that particular IHS such that any attempts to utilize the token by other IHSs are detectable.

In some instances, the identification of available resources by the remote access controller 410 and the receipt of an authorization token from the workspace orchestration service 420 is completed upon initialization of the remote access controller 410 and prior to the user commencing actual use of the IHS. Once the IHS has been initialized and is in use, at 525, a workspace may be initialized or reinitialized. In some instances, a workspace may be initialized in response to a user requesting access to a protected resource via a launch point operating on the IHS, such as described with regard to FIG. 2. As described with regard to FIGS. 3A and 3B, an IHS supporting the use of workspaces may operate using a workspace management agent, represented as 415 in FIG. 4, that is used to deploy and manage workspaces operating on the IHS.

In response to a user initiating a request for use of a protected resource through operation of a workspace, at 435, the workspace management agent 415 transmits a request for a workspace for use of the protected resource to the workspace orchestration service 420. At 440, the workspace orchestration service 420 generates a workspace definition for generating and operating a workspace that provides the user with access to the protected resource. As described above, a workspace definition may be selected based on factors such as the security context and productivity context of the IHS that will host the workspace, the user making the request and/or the logical and physical environment in which the workspace will operate. Various types of context information may be provided to the workspace orchestration service 420 as part of the request from the workspace management agent 415. Additional context information may be collected by the workspace orchestration service 420 from the remote access controller 410. Based on evaluation of the context information, at 445, the workspace orchestration service 420 transmits the workspace definition and other data for generating a workspace to the workspace management agent 415.

Using the received workspace definition, at 448, the workspace management agent 415 instantiates and deploys the workspace 405 that will provide the user with access to the protected resource. With the workspace 410 deployed and in use, at 450 of FIG. 4 and at 530 of FIG. 5, the workspace 410 registers a request for use of available IHS resources with the workspace orchestration service 420. As described with regard to FIG. 3B, each workspace 331A-N that is configured and deployed according to embodiments may include a local resource service 335A-N that is configured to provide a respective workspace with access to local resources of the IHS that are otherwise unavailable due to the isolation of the workspace from all or part of the hardware and software of the IHS. As described, a workspace may provide access to a protected resource within a virtualized logical environment that relies on abstractions from the underlying hardware and the operating system of an IHS, thus isolating the workspace from these local resources of the IHS.

Upon receipt of a registration request from workspace 405, at 455, the workspace orchestration service 420 responds by providing workspace 405 with a list of the available resources of the IHS that are available for use by workspaces, as specified, at 425, by the remote access controller 410. As indicated in FIG. 5, at 535, the workspace orchestration service 420 may validate the registration request received from workspace 405. In some embodiments, the workspace 405 may include a unique identifier in its registration request transmitted to the workspace orchestration service 420. In such instances, this unique identifier presented by the workspace 405 is an identifier that was included in the workspace definition that was generated by the workspace orchestration service 420 and used to deploy the workspace 405. By presenting this unique identifier in its registration request, the workspace orchestration service 420 may validate that the request originates from an authentic workspace that is operating using a workspace definition generated by the workspace orchestration service 420. Once the workspace 405 has been validated, at 540 and at 455, the workspace orchestration service 420 provides the workspace 405 with an authorization token for use in authenticating the workspace 405 and its use of IHS resources made available via the remote access controller 410. In some embodiments, the token provided to the workspace 405 may be calculated by the orchestration service 420 based on the unique identifier of the workspace, thus binding the token for use by that particular workspace such that any attempts to utilize the token by other workspaces are detectable.

As indicated at 455 of FIG. 4 and at 545 of FIG. 5, the workspace orchestration service 420 also provides the workspace 405 with the list of IHS resources that have been made available by the remote access controller 410 for use by workspaces. At 550, the workspace 405 may evaluate the list of available IHS resources against its workspace definition in order to determine the available IHS resources that are compatible with the operating constraints specified by the workspace definition. For instance, a required minimum security score associated with a workspace definition may prohibit the use of certain IHS resources. At 460, the workspace 405 selects from the list of available IHS resources based on compatibility with the workspace definition in order to gain access to IHS capabilities that are not otherwise available to workspace 405. At 465 of FIG. 4 and at 555 of FIG. 5, the workspace 405 notifies the workspace orchestration service 420 of its selection from the list of IHS resources that has been made available by the remote access controller 420 of the IHS.

In response to the selection of an IHS resource by workspace 405, at 560 and as indicated at 470, the workspace orchestration service 420 provides the remote access controller 410 with a handle to the requested IHS resource, where this handle specifies the IHS resource to be provided, a mechanism for invoking the IHS resource and any constraints that may limit the duration of the workspaces' use of the IHS resource. At 565 and as indicated at 475, this same handle may be provided by the workspace orchestration service 420 to the workspace 405 that has requested access to the local IHS resource. In some embodiments, the handle provided by the workspace orchestration service 420 may specify various aspects of the local IHS resource that is being made available to the workspace 405 by the remote access controller 410. In addition to identifying the resource, the handle may also specify an API (Application Programming Interface) that is to be supported by the remote access controller 410 for use by the workspace 405 in invoking the IHS resource. The API included in the handle may specifies as a list of methods that are supported by the remote access controller 410, where the specified methods may be identified by a signature that specifies method arguments that must be supplied by the workspace 405 and responses that will be provided by the remote access controller 410. For instance, if the local resource that is selected is use of ACPI power management functions, the API specified in the handle may list a set of method signatures that are supported by the remote access controller 410 in providing ACPI functionality to workspace 405.

In providing a means by which the API included in the handle may be invoked, the handle may also include a reference to an IPC (Inter-Process Communications) resource of the IHS that is to be used in the API communications between the remote access controller 410 and the workspace 405. For instance, the handle may include a pointer to a memory location or data buffer that is to be used in the transmission of data between the remote access controller 410 and the workspace 405. In other instances, the handle may include a reference identifying a socket or pipe by which data maybe transmitted by a workspace 405 to the remote access controller 410 and by which responsive data resulting from execution of an API call may be provided to the workspace 405 by the remote access controller 410.

In addition to specifying the API that is supported and a reference to an IPC resource of the IHS, the handle provided by the workspace orchestration service 420 may also include a token that may be used to specify constraints on the duration of the validity of the handle. In some embodiments, the token included in a handle may be generated based on the token provided to the remote access controller 410, which may be based on a unique identifier of the IHS, and may also be generated based on the token provided to the workspace 405, which may be based on a unique identifier of the workspace. In this manner, the token included in the handle may be bound to the IHS and to the workspace 405 such that use of the handle on another IHS or by another workspace is detectable.

In some instances, a token specified in a handle may be valid for the duration of the lifespan of the workspace 405. Accordingly, in such instances, no limitations or conditions on the token are specified in the handle. However, in other instances, the validity of a token may be limited according to various conditions specified in the handle. In such instances, the token included in the handle is thus a session token with a limited term of validity. For example, conditions set forth in the handle may specify that the session token is only valid until a certain time. As described with regard to FIG. 1, an IHS according to embodiments may include sensors capable of determining whether a user is in proximity to the IHS. In some instances, conditions set forth in the handle may specify that a session token becomes invalid upon detecting that the user of the IHS can no longer be detected in proximity to the IHS. In another example where the IHS is a laptop computer, the conditions set forth in the handle may specify that the session token is only valid until the lid of the laptop is closed. In another example, the conditions set forth in the handle may specify that the session token becomes invalid if the IHS is moved to a different location, or is moved outside of a specific location.

As describe above, a workspace definition may be associated with a security score that is measure based on the security context in which the workspace is deployed. In some embodiments, a session token specified in a handle may be limited based on conditions requiring a minimum security score in order for the token to remain valid. In such embodiments, the workspace management agent 415 may monitor for changes in the security context of the workspace 405. Examples of detected changes in the security context may include a change in the antivirus software in use by the IHS, a change in the network access point used by the IHS, a change in the location of the IHS from a corporate environment to a public location, and/or a change of the individual that is using the IHS. Upon detecting such changes in the security context, a new security score may be calculated for the workspace. If the security score drops below a certain threshold, a session token included in a handle may become invalid.

With the remote access controller 410 and the workspace 405 both provided with the handle generated by the workspace orchestration service 420, the workspace 405 may commence use of the selected IHS resource by using the handle to issue commands to the selected IHS resource. Using the provided handle, at 570, the workspace 405 generates a command that invokes the selected resource of the IHS by generating an API call that is specified in the handle. In some embodiments, these API calls may be generated by a local resource service 335A-N, as described with regard to FIG. 3B, of the workspace 405 that may be configured to managed operations for requesting and managing use of a local resource on behalf of the workspace 405. At 575 and as indicated at 480 of FIG. 4, the workspace 405 transmits the API call to the remote access controller 410 using the IPC resource that is included in the handle for communications between the remote access controller 410 and the workspace 405. At 580, the API call issued via the IPC resource specified in the handle is received by the remote access controller 410. As described with regard to FIG. 3B, remote access controller 410 may include a secure communication support module 350 that is configured to manage communications with workspaces. In particular, this secure communication support module may manage communications with individual workspaces via an IPC resource specified in a handle provided by the workspace orchestration service for communications with that particular workspace.

Upon receipt of an API call from a workspace via the IPC resource, the remote access controller 410 processes the API call on behalf of the workspace. For instance, if a handle provides a workspace 405 with access to ACPI resources of an IHS, an API call received according to that handle is processed by the remote access controller 410 by invoking the corresponding ACPI method of the IHS that may be supported by the BIOS of the IHS, or by the remote access controller 410 itself. In another example, if the API call is received via an IPC resource corresponding to a handle that provides workspace 405 with use of thread management functions supported by an IHS, the data received by the remote access controller 410 via the IPC resource is used to perform thread management functions on behalf of the workspace. Once the operation invoked on behalf of the workspace 405 has been completed, at 585 and as indicated at 485 of FIG. 4, the remote access controller 410 utilizes the IPC resource provided in the handle to provide the workspace 405 with a responsive communication specified by the API call made by the workspace. For instance, if an ACPI method requesting the current power state of the IHS has been invoked by the API call received from the workspace 405, the response by the remote access controller 410 relays the current power state back to the workspace via the IPC resource specified in the handle.

According to embodiments of the present disclosure, a cache database 362 and an associated cache database management interface 364 may be provided for storing information used by the workspaces 331A-N. The cache database 362 may be used to store files or digital content common to some, most, or all of the workspaces 331A-N. For example, the cache database 362 may be used to store executable files, such as dynamic linked library (DLL) files, application files, or other files including executable code that may be shared among certain workspaces 331A-N. As another example, the cache database 362 may be used to store audio and/or video content that is generated by a first workspace and consumed by a second workspace seamlessly.

Cache database management interface 364 provides an interface for secure communication with the workspace orchestration service 206, and may include logic for implementing certain features of the cache database 362. In one embodiment, cache database management interface 364 may implement a cloud caching system where commonly accessed cloud sourced files may be cached to alleviate communication traffic that would otherwise be required each time a workspace 311A-N requires access to content from a cloud-based source. In another embodiment, cache database management interface 364 may implement a user context discovery system for providing contextual continuity for custom workspaces instantiated on different environments based on each user's personal profile. Methods for providing the cloud caching system and user context discovery system will each be described in detail herein below. In one embodiment, cache database 362 and cache database management interface 364 may be configured inside of a workspace 331A-N so that it can be securely managed by workspace orchestration service 206.

According to one embodiment, an BIOS interface agent 368 may be provided in BIOS 135 of IHS 100. In general, BIOS interface agent 368 provides a direct interface for communication between the BIOS 135 along with any associated embedded controllers, and the workspace orchestration service 206. In many currently produced IHSs, the BIOS often includes a SMBIOS interface that can be used to read management information produced by the BIOS 135 of an IHS 100. This feature can eliminate the need for the operating system to probe hardware directly to discover what devices are present in the computer. As such, the BIOS interface agent 368 provide a technique to access characteristics of hardware devices configured in the IHS 100 as well as to manipulate or otherwise modify those hardware resources. In one embodiment, a secure network connection may be established between the BIOS interface agent 368 and workspace orchestration service 206 using the network tunneling service 364.

Figure 6:
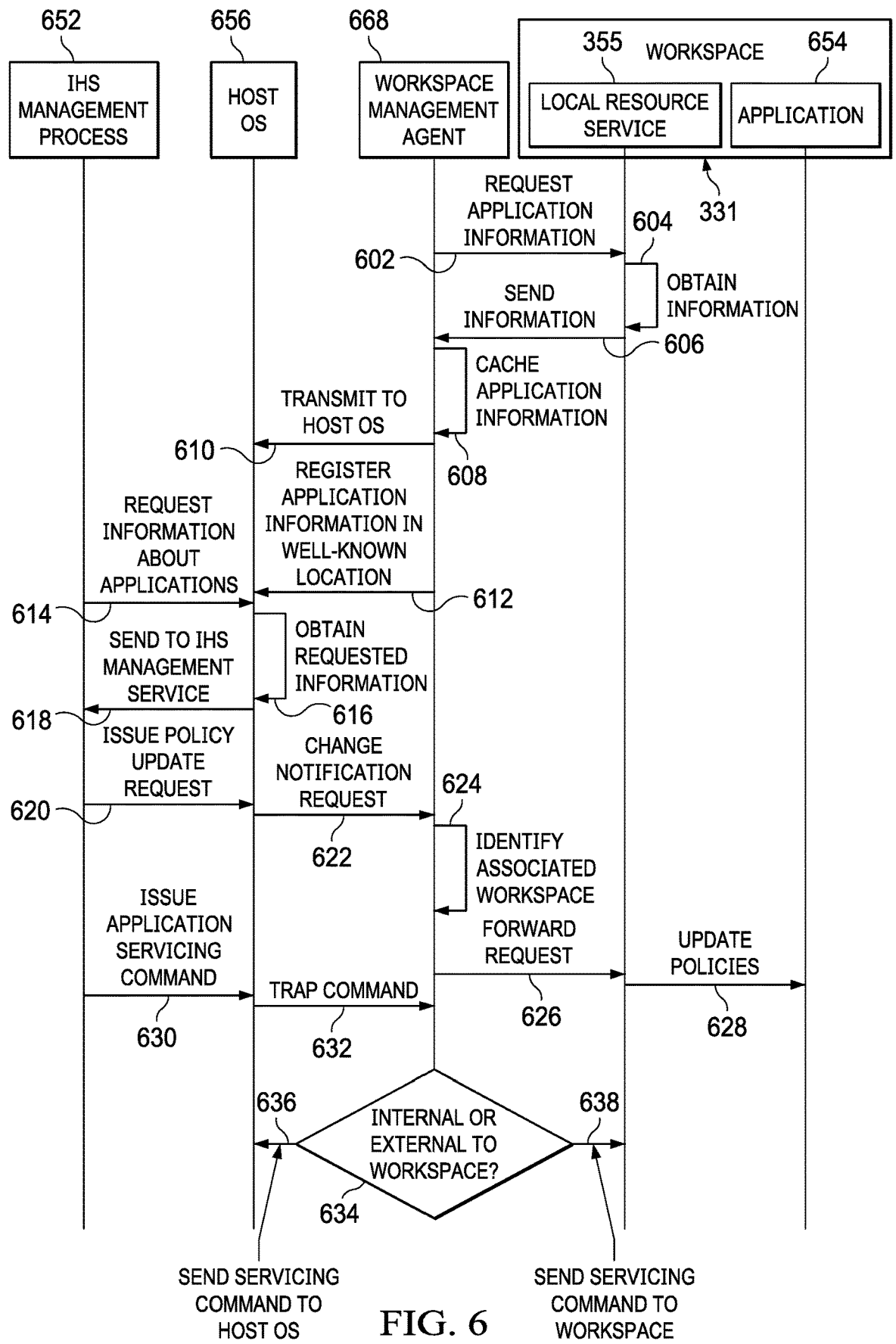
FIG. 6 is a workflow diagram describing certain steps of one embodiment of a workspace administration method using an IHS management process according to one embodiment of the present disclosure.

FIG. 6 is a workflow diagram describing certain steps of one embodiment of a workspace administration method 600 using an IHS management process 652 according to one embodiment of the present disclosure. As will be described in detail herein below, the workspace administration method 600 may be provided for enabling an IHS management system to administer and/or otherwise manage workspaces 331 as well as applications 654 executed in those workspaces 331. Using the workspace administration method 600, the performance of the workspace applications can be effectively optimized without any substantial modifications to the workspace applications and/or the resources used to executed the containerized applications.

Information handling systems are often implemented with various IHS management systems. Example IHS management processes include those adapted for administration of distributed systems, such as a Systems Center Configuration Manager (SCCM). Other IHS management processes may include those adapted for other purposes, such as business activity monitoring (BAM), application service management (ASM), network management, and the like. Within this disclosure, an IHS management process generally refers to any executable process that provides for administration and/or servicing of an IHS.

Referring again to FIG. 6, the workspace administration method 600 involves an IHS management process 652, a host OS 656, a workspace orchestration service 615, a workspace 331 configured with a local resource service 355 and an application 654 that may be executed on IHS 100. Only one workspace 331 is shown and described herein for purposes of brevity and clarity of discussion; nevertheless, it should be appreciated that the workspace administration method 600 may be performed with any quantity and configuration of workspaces 331. Additionally, while the workspace 331 is shown configured with a single application 654, it should be appreciated that the workspace 331 may have any number of applications 654 that can be managed by the workspace administration method 600.

Steps 602-612 generally describe an initialization sequence that may be performed each time the IHS 100 is initialized (e.g., bootstrapped), and before any administration of workspace-based applications 654 occurs. Initially at step 602, the workspace management agent 668 issues a request for information about the application 654. The information includes any type that may be used for administration of the application 654 and/or how execution of the application 654 is coordinated with the execution of other application or processes on IHS 100. Examples of such information includes a name of the application, version of the application, a digital security signature associated with the application 654, administrative template files (e.g., active directory management (ADM) files, etc.), and the like. Thereafter at step 604, the local resource service 355 obtains the requested information, and sends it to the workspace management agent 668 as requested at step 606.

At step 608, the workspace management agent 668 caches the obtained application information in a database, such as database 362, and transmits the application information to the host OS 656 at step 610. The application information is then stored locally to be used by the IHS management process 652, such as in a well-known location that is commonly available to administrative services executed on the IHS 100. For example, the well-known location may be the OS registry, such as the Windows registry provided by many OS products from Microsoft Corporation. Whereas storage in a well-known location may be useful for identifying and accessing the application information by a IHS management process 652, storage in the database 362 may be useful for associating the application with its particular workspace 331 in the IHS 100 so that it can be managed by IHS management process 652. At step 612, the workspace management agent 668 registers for administration by the IHS management process 652. For example, the application information may include certain policies associated with how it is to be executed, and under what conditions (e.g., minimum requirements) that its execution may be modified, which is stored in an administrative template file (e.g., ADM file).

Steps 614-618 generally describe a discovery process that may be performed for the IHS management process 652. At step 614, the IHS management process 652 issues a request for information about some, most, or all applications launched on the IHS 100. That host OS 656, having stored the application information earlier at step 610, retrieves it at step 616, and sends it to the IHS management process 652 at step 618. The discovery process may be repeatedly performed at any time for updating the application information stored for use by the IHS management process 652. For example, the discovery process may be performed each time an application 654 is launched in a workspace, or each time a workspace 311 including its associated application 654 is deleted. Thus at this point, the workspace application 654 has been initialized by the method 600, and is prepared to be managed by the IHS management process 652.

Steps 620-628 generally describe an example policy updating sequence that may be performed by the method 600 to update policies administered by the IHS management process 652 to the workspace application 654. For example, steps 620-628 may be performed whenever the IHS management process 652 desires to administer or otherwise change the operational characteristics of how the workspace application 654 is executed on IHS 100.

At step 620, the IHS management process 652 issues a policy update request to the host OS 656. For example, the IHS management process 652 may send an administrative template (e.g., ADM file, etc.) to the host OS 656 indicating that the operating mode of the workspace application 654 is to be changed. The host OS 656 receives the policy update request and issues a change notification request to the workspace management agent 668 at step 622. The workspace management agent 668, using the information stored in the database 362 earlier at step 608, is able to identify the workspace 331 into which the affected workspace application 654 is configured at step 624. The workspace management agent 668 accesses the workspace 331 to forward the request at step 626 to its associated local resource service 355. The local resource service 355 then updates the policies associated with the workspace application 654 at step 628.

Steps 630-638 generally describe an example application servicing sequence that may be performed by the method 600 to service workspace applications 654 via the IHS management process 652. For example, it may be beneficial in certain cases to launch another workspace application 654 in an existing workspace 331, or delete (e.g., exit) a workspace application 654 that is currently being executed in the workspace 331 by an IHS management process 652. Whereas conventional workspace management techniques have not been provided with the ability of selectively servicing applications within workspaces by an IHS management process 652, the present application servicing sequence provides a means in which the execution of certain applications can be directed into workspaces 331 under the control of the workspace management agent 668.

At step 630, the IHS management process 652 issues an application servicing command (e.g., msiexec, etc.) to the host OS 656. Thereafter at step 632, the IHS management process 652 traps the application servicing command, and forwards the command to the workspace management agent 668. The action of trapping generally refers to a process whereby a message (e.g., system call) is detected and re-routed, which in the present case, to the workspace management agent 668. At step 634, the workspace management agent 668 determines whether the requested application is to be associated internally to or externally from a workspace 331. For example, the workspace management agent 668 may be configured with logic to selectively launch certain types of applications within a workspace 331, while other types of applications are launched external to the workspace 331. Furthering the present example, it may be beneficial, for security reasons, to launch a certain type of network stack, such as one that is directed to an untrusted source internal to a workspace 331, while another network stack, which is directed to a trusted source, can be launched outside of the workspace 331.

Nevertheless, if the application 654 is to be associated external to the workspace 331, the workspace management agent 668 sends a request to the host OS 656 to have the application 654 launched thereby at step 636; otherwise, the workspace management agent 668 sends a request to the local resource service 355 to have the application 654 launched inside of the workspace 331 at step 638.

Each of the discovery sequence, the policy updating sequence, and/or the application servicing sequence of the workspace administration method 600 described above may be repeatedly performed for each workspace 331 configured in the IHS 100. Nevertheless, when use of the workspace administration method 600 is no longer needed or desired, the process ends.

Although FIG. 6 describes an example method that may be performed for administering the operation of workspace applications by a IHS management process 652, the features of the method 600 may be embodied in other specific forms without deviating from the spirit and scope of the present disclosure. For example, the method 600 may perform additional, fewer, or different operations than those described in the present examples. As another example, the steps of the method 600 may be performed by a computing system other than the IHS 102, such as via a cloud service as described above.

Figure 7:
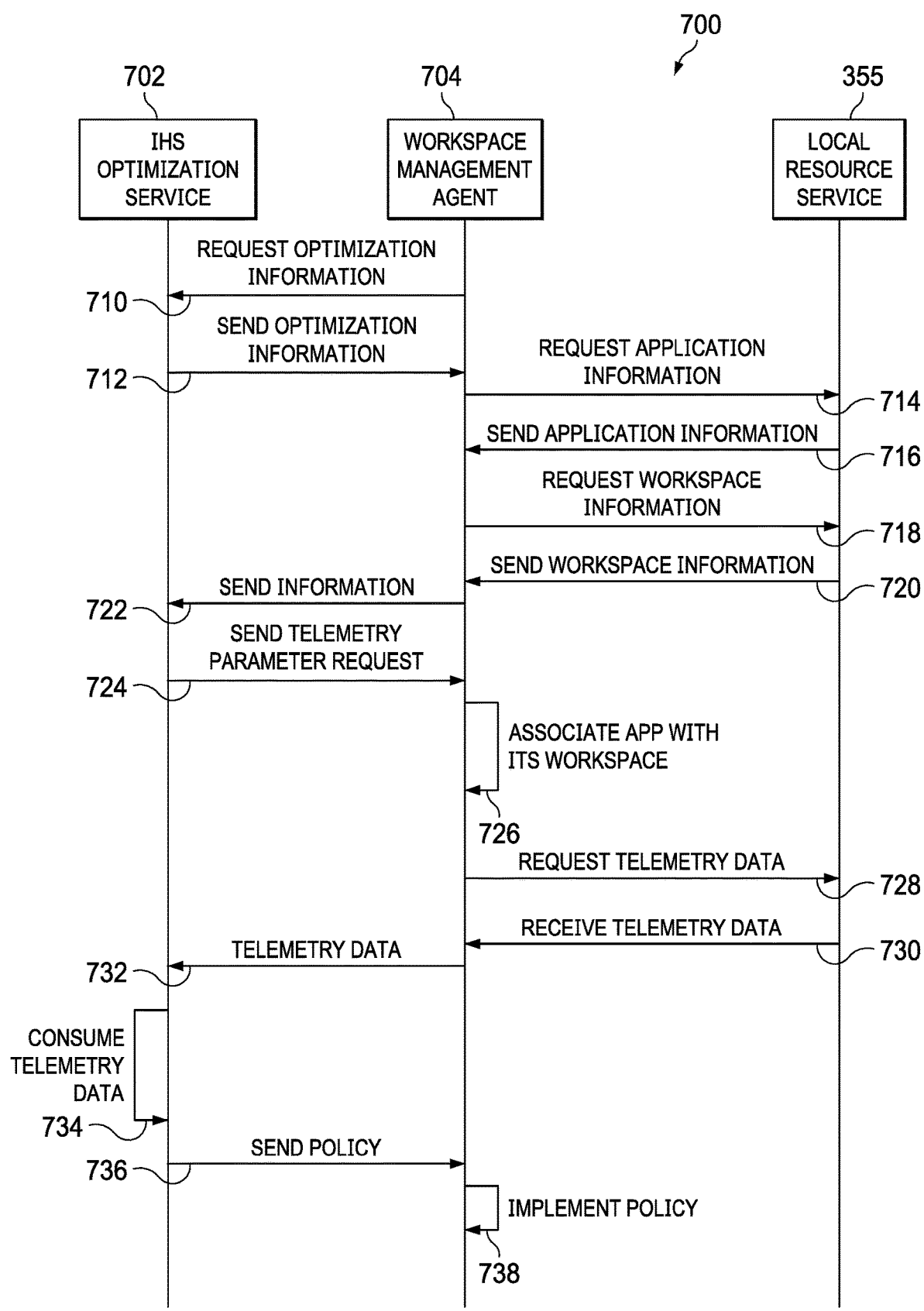
FIG. 7 is a workflow diagram describing one embodiment of a workspace administration method using an IHS optimization service according to one embodiment of the present disclosure.

FIG. 7 is a workflow diagram describing one embodiment of a workspace administration method 700 using an IHS optimization service 702 according to one embodiment of the present disclosure. As will be described in detail herein below, the workspace administration method 700 may be used by an IHS optimization service 702 to access and manage an application configured in a workspace 331.

Information handling systems have conventionally been able to perform optimization services using tools, such as Dell Optimizer, Dell Precision Optimizer, and the like, which can considered to be a type of IHS management process. With the advent of workspace usage, however, system optimization has become significantly more complex, due at least in part to isolation provided by these workspaces. Many currently implemented applications are provided in workspaces for improved security and scalability. These workspace technologies isolate operating system (OS) services and host applications apart from the workspace applications (a.k.a., containerized-apps). This typically inhibits the existing optimization services from working with the workspace applications. Thus, providing optimizing services has heretofore remained a challenging endeavor when used in conjunction with workspace orchestration systems. As will be described in detail herein below, embodiments of the present disclosure provide a solution to these problems, among other things, using a workspace administration system and method for a workspace orchestration service.

Referring again to FIG. 7, the workspace administration method 700 involves an IHS optimization service 702, a workspace management agent 704, and a local resource service 355 that is configured in a workspace 331 with one or more applications (not shown). Only one local resource service 355 is shown and described herein for purposes of brevity and clarity of discussion; nevertheless, it should be appreciated that the workspace administration method 700 may be performed with any quantity and configuration of local resource services 355 each having different quantities and types of applications.

Steps 710-722 generally describe an initialization sequence that may be performed when the IHS optimization service 702 is initialized, such as when the IHS optimization service 702 is used for the first time to gather telemetry data from which optimization of the IHS 100 may be performed. Initially at step 710, the workspace management agent 704 issues a request for optimization information from the IHS optimization service 702. The optimization information may include, for example, the capabilities of the IHS optimization service 702 as well as certain telemetry parameters about any applications that the IHS optimization service 702 may desire to use for optimizing performance of the IHS 100. At step 712, the workspace management agent 704 receives the optimization information from the IHS optimization service 702, and using this information, communicates with the local resource service 355 configured in each workspace 331 to request application information associated with the requested optimization information at step 714. Thereafter at step 716, the local resource service 355 responds by sending the requested application information to the workspace management agent 704. The application information may include that which the IHS optimization service 702 uses to monitor the behavior of each workspace application, such as a name or identity of the workspace application, any digital signatures used, peripherals used, and minimum operating requirements (e.g., minimum amount of memory needed, minimum processing speed, networking requirements, etc.). The workspace management agent 704 then stores the received application information in memory, such as in cache database 362.

At step 718, the workspace management agent 704 sends a request for workspace information from the local resource service 355. The workspace information may include that which is used to manipulate or otherwise manage the workspace itself. Examples of such workspace information may include any restrictions and/or privileges associated with the workspace 331, such as maximum or minimum resource allocation levels, workspace parameters that may be restricted from external control, and the like. The workspace management agent 704 then receives the workspace information at step 720 and stores it in memory (e.g., cache database 362). In one embodiment, the workspace management agent 704 may store information (e.g., lookup table)

that associates the workspace applications with the workspaces 331 they are configured in. Whereas many conventional IHS optimization services 702 are configured to address applications directly, such as via the OS registry, they typically possess no native means of addressing workspace applications configured in workspaces 331. As such, the workspace management agent 704 may include logic for associating each workspace application with the workspace 331 it is configured in so that it can be accessed by the IHS optimization service 702.

Additionally in some embodiments, the workspace management agent 704 may convert the application information and/or workspace information into a form used by the IHS optimization service 702. That is, the received application information and workspace information may be normalized by the workspace management agent 704 so that it can be used by the IHS optimization service 702. Thereafter at step 722, the workspace management agent 704 sends the application information and workspace information to the IHS optimization service 702. Thus at this point, the IHS optimization service 702 has gathered information from each workspace 331 sufficient for gathering telemetry data from applications configured in workspaces 331, and generating profile recommendations based on the telemetry data obtained from the workspace application, and sending those profile recommendations back to the workspaces 331 for optimizing a performance of the IHS 100.

Steps 724-736 generally describe an optimization sequence that may be performed to optimize performance of the IHS 100 using telemetry data obtained from the workspace applications. Moreover, the optimization sequence may be repeatedly performed at an ongoing basis for continual optimization as the IHS 100 is used. At step 724, the IHS optimization service 702 gathers telemetry data by sending a telemetry parameter request to the workspace management agent 704. At step 726, when the workspace management agent 704 receives this request, it identifies the workspace 331 that the workspace application is configured in using the cached stored at step 720. Once identified, the workspace management agent 704 send a request for the telemetry parameter from its associated workspace 331 at step 728. Thereafter at step 730, the workspace management agent 704 receives the requested telemetry parameter from the local resource service 355, and forwards it to the IHS optimization service 702 at step 732. The IHS optimization service 702 can then, at step 734, consume (e.g., use) the requested telemetry data, along with telemetry data obtained from other resources in the IHS 100, to generate one or more policies or profile recommendations.

After some point in time when a certain policy or profile recommendation is generated for the workspace application, the IHS optimization service 702 sends the policy to the workspace application via the workspace management agent 704 at step 736. Then at step 738, the received policy may be implemented or enforced by the workspace management agent 704.

Figure 8:
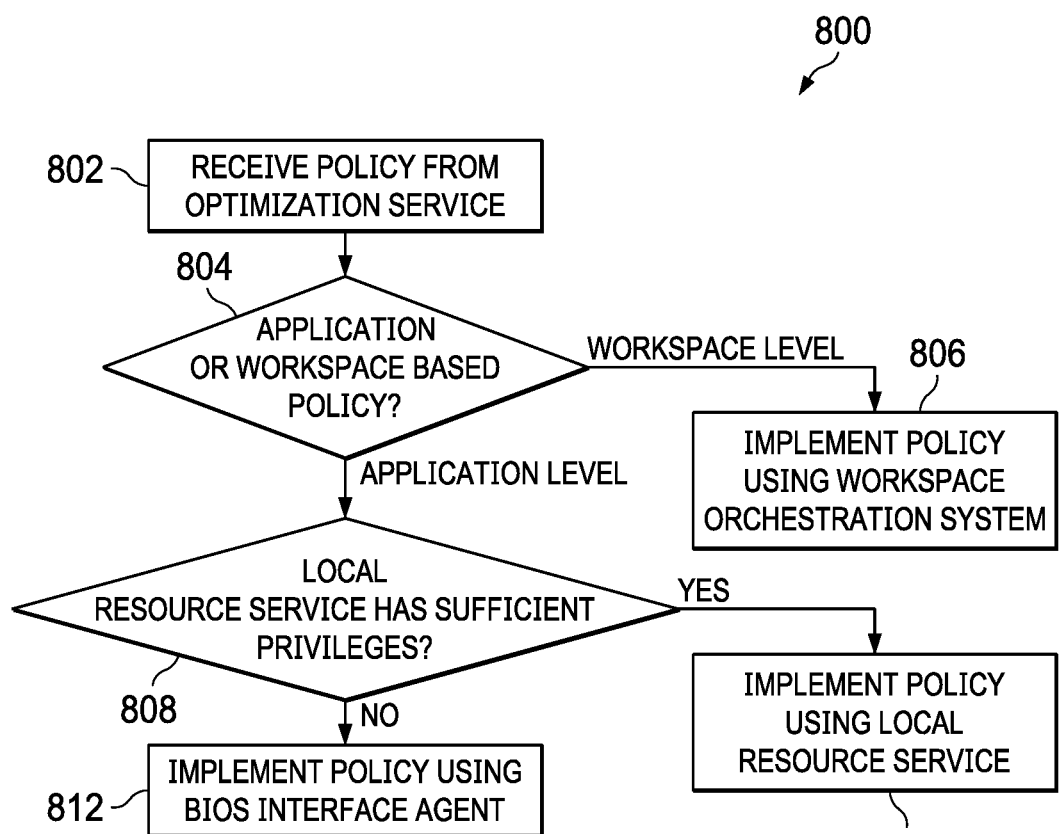
FIG. 8 illustrates an example policy implementation process that may be performed to implement a policy on a workspace application according to one embodiment of the present disclosure.

FIG. 8 illustrates an example policy implementation process 800 that may be performed to implement a policy on a workspace application according to one embodiment of the present disclosure. Initially at step 802, the workspace management agent 704 receives the policy from the IHS optimization service 702. Then at step 804, the process 800 determines if the policy is associated with the workspace 331 or the workspace application itself. If the policy is associated with the workspace 331, processing continues at step 806; otherwise, processing continues at step 808. At step 806, the workspace management agent 704 will communicate with the workspace orchestration service 206 to implement the policy on the workspace 331. Once the policy has been implemented using the workspace orchestration service 206, the method 800 ends.

Nevertheless, if the policy is an application level policy, processing continues at step 808 in which the method 800 determines whether or not the local resource service 355 possesses sufficient privilege to implement the policy. If so, processing continues at step 810 in which the workspace management agent 704 communicates with the local resource service 355 to implement the application based policy. Should the local resource service 355 not have sufficient privilege, the workspace management agent 704 may communicate with the BIOS interface agent 368 to implement the policy, such as using an appropriate system call (e.g., UNIX 'nice' or 'ionice' commands). Thus, the policy generated by the IHS optimization service 702 may be implemented or enforced according to the type of policy (application or workspace policy) and even in cases where the local resource service 355 does not provide sufficient privileges to enforce the policy.

Thus as can be clearly seen from the foregoing disclosure, the workspace administration system may be used to enable IHS optimization using telemetry data obtained from workspace applications without substantial modification to existing IHS optimization tools. Additionally, those workspace applications may themselves be adapted by conventional IHS optimization tools for overall IHS system optimization.

Although FIGS. 7 and 8 describes an example method that may be performed for enabling optimization with workspace applications, the features of the disclosed methods may be embodied in other specific forms without deviating from the spirit and scope of the present disclosure. For example, the methods may perform additional, fewer, or different operations than those described in the present examples. As another example, the steps of the methods may be performed by a computing system other than the IHS 102, such as via a cloud service as described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a processor and a memory coupled to the processor, the memory storing program instructions that, upon execution by the processor, cause the IHS to, for each workspace of a plurality of workspaces instantiated on the IHS:
upon instantiation of each workspace, communicate with the workspace to establish a secure communication tunnel between the IHS and the workspace, and create a handle for the workspace, wherein the handle provides the workspace with access to an IHS resource;
communicate via the secure communication tunnel associated with the workspace, based at least in part on a local resource service executed on the workspace, to receive one or more application parameters associated with an application configured in the workspace, wherein the IHS determines whether to permit or deny access by the workspace to an IHS resource, based at least in part on validity of an authorization token included with the handle;
store the one or more application parameters in a registry database of an operating system executed on the IHS;
based at least in part on an IHS management process, identify at least one of the one or more application parameters that are to be modified, wherein the IHS management process accesses the one or more application parameters from the registry database;
based at least in part on the registry database, identify the workspace associated with the one application; and
communicate with the workspace, based at least in part on the local resource service, to send information associated with the at least one application parameter to the workspace, wherein the workspace is executed to modify the application according to the at least one application parameter.

2. The IHS of claim 1, wherein the IHS management process comprises a systems management software process.

3. The IHS of claim 2, wherein the instructions are further executed to:
communicate with the workspace to receive one or more workspace parameters associated with the workspace;
store the one or more workspace parameters in the registry database;
using the IHS management process, identify at least one of the workspace parameters that is to be modified, wherein the IHS management process accesses the one or more workspace parameters from the registry database; and
communicate with the workspace to send information associated with the at least one workspace parameter to the workspace, wherein the workspace is executed to modify the workspace according to the at least one workspace parameter.

4. The IHS of claim 1, wherein the instructions are further executed to perform a discovery process to identify the application parameters for a plurality of the applications executed in a plurality of the workspaces instantiated on the IHS.

5. The IHS of claim 1, wherein the instructions are further executed to cache the application parameters at another specified location, wherein the instructions are further executed to associate the one or more application parameters that are to be modified with the workspace using the other specified location.

6. The IHS of claim 1, wherein the IHS management process comprises an IHS optimizer that is executed to optimize a performance of the IHS using a machine learning (ML) process.

7. The IHS of claim 3, wherein the instructions are further executed to:
when the IHS management process identifies the application parameter, use instructions executed inside the workspace to apply the application parameter; and
when the IHS management process identifies the workspace parameter, use instructions external to the workspace to apply the workspace parameter.

8. The IHS of claim 1, wherein the instructions are further executed to:
determine whether the IHS management process has sufficient privilege to apply the application parameter; and
when the IHS management process does not have sufficient privilege, use instructions external to the operating system of the IHS to apply the application parameter.

9. A method comprising:
communicating with a workspace upon instantiation of the workspace in an Information Handling System (IHS) to establish a secure communication tunnel between the IHS and the workspace;
creating a handle configured to provide the workspace with access to an IHS resource;
communicating, via the secure communication tunnel, with the workspace to receive one or more application parameters associated with an application configured in the workspace, using a local resource service executed on the workspace, wherein the IHS determines whether to permit or deny access by the workspace to an IHS resource, based at least in part on validity of an authorization token included with the handle providing the workspace access to the IHS resource;

storing the one or more application parameters in a registry database of an operating system executed on the IHS;

using an IHS management process, identifying at least one of the one or more application parameters that is to be modified, wherein the IHS management process accesses the one or more application parameters from the registry database;

using the registry database, identify the workspace associated with the one application; and communicating with the workspace to send information associated with the at least one application parameter to the workspace, wherein the workspace is executed to modify the application according to the at least one application parameter.

10. The method of claim 9, further comprising:

communicating with the workspace to receive one or more workspace parameters associated with the workspace;

storing the one or more workspace parameters at the registry database;

using the IHS management process, identifying at least one of the workspace parameters that is to be modified, wherein the IHS management process accesses the one or more workspace parameters from the registry database; and communicating with the workspace to send information associated with the at least one workspace parameter to the workspace, wherein the workspace is executed to modify the workspace according to the at least one workspace parameter.

11. The method of claim 9, further comprising performing a discovery process to identify the application parameters for a plurality of the applications executed in a plurality of the workspaces instantiated on the IHS.

12. The method of claim 9, further comprising caching the application parameters at another specified location, and associating the one or more application parameters that are to be modified with the workspace using the other specified location.

13. The method of claim 12, further comprising:

when the IHS management process identifies the application parameter, using instructions executed inside the workspace to apply the application parameter; and when the IHS management process identifies the workspace parameter, using instructions external to the workspace to apply the workspace parameter.

14. The method of claim 9, further comprising:

determining whether the IHS management process has sufficient privilege to apply the application parameter; and when the IHS management process does not have sufficient privilege, using instructions external to the operating system of the IHS to apply the application parameter.

15. A system comprising:

a processor and a memory coupled to the processor, the memory storing program instructions that, upon execution by the processor, cause an information handling system (IHS) to, for each of a plurality of workspaces instantiated on the IHS:

upon instantiation of each workspace, communicate with the workspace to establish a secure communication tunnel between the IHS and the workspace, and create a handle for the workspace, wherein the handle provides the workspace with access to an IHS resource;

communicate via the secure communication tunnel associated with the workspace, based at least in part on a local resource service executed on the workspace, with the workspace to receive one or more application parameters associated with an application configured in the workspace, wherein the IHS determines whether to permit or deny access by the workspace to an IHS resource, based at least in part on validity of an authorization token included with the handle;

store the one or more application parameters in a registry database of an operating system executed on the IHS;

based at least in part on an IHS management process, identify at least one of the one or more application parameters that is to be modified, wherein the IHS management process accesses the one or more application parameters from the registry database;

based at least in part on the registry database, identify the workspace associated with the one application; and communicate with the workspace to send information associated with the at least one application parameter to the workspace, wherein the workspace is executed to modify the application according to the at least one application parameter.

16. The system of claim 15, wherein the instructions are further executed to:

communicate with the workspace to receive one or more workspace parameters associated with the workspace;

store the one or more workspace parameters at the registry database;

using the IHS management process, identify at least one of the workspace parameters that is to be modified, wherein the IHS management process accesses the one or more workspace parameters from the registry database; and communicate with the workspace to send information associated with the at least one workspace parameter to the workspace, wherein the workspace is executed to modify the workspace according to the at least one workspace parameter.

17. The system of claim 16, wherein the instructions are further executed to perform a discovery process to identify the application parameters for a plurality of the applications executed in a plurality of the workspaces instantiated on the IHS.

18. The system of claim 16, wherein the instructions are further executed to cache the application parameters at another specified location, wherein the instructions are further executed to associate the one or more application parameters that are to be modified with the workspace using the other specified location.

19. The system of claim 16, wherein the instructions are further executed to:

when the IHS management process identifies the application parameter, use instructions executed inside the workspace to apply the application parameter; and when the IHS management process identifies the workspace parameter, use instructions external to the workspace to apply the workspace parameter.

* * * * *